United States Patent
Furukawa

(10) Patent No.: US 11,329,584 B2
(45) Date of Patent: May 10, 2022

(54) CONTROL DEVICE FOR AC ROTATING MACHINE, AND CONTROL DEVICE FOR ELECTRIC POWER STEERING

(71) Applicant: Mitsubishi Electric Corporation, Tokyo (JP)

(72) Inventor: Akira Furukawa, Tokyo (JP)

(73) Assignee: Mitsubishi Electric Cornoration, Tokyo (JP)

(*) Notice: Subject to any disclaimer, the term of this patent is extended or adjusted under 35 U.S.C. 154(b) by 0 days.

(21) Appl. No.: 16/976,490

(22) PCT Filed: Mar. 5, 2018

(86) PCT No.: PCT/JP2018/008384
§ 371 (c)(1),
(2) Date: Aug. 28, 2020

(87) PCT Pub. No.: WO2019/171438
PCT Pub. Date: Sep. 12, 2019

(65) Prior Publication Data
US 2020/0412285 A1 Dec. 31, 2020

(51) Int. Cl.
*H02P 21/00* (2016.01)
*H02P 21/05* (2006.01)
(Continued)

(52) U.S. Cl.
CPC ............ *H02P 21/05* (2013.01); *B62D 5/0463* (2013.01); *H02P 21/22* (2016.02)

(58) Field of Classification Search
CPC ........ H02P 21/05; H02P 21/22; B62D 5/0463
See application file for complete search history.

(56) References Cited

U.S. PATENT DOCUMENTS 9,954,472 B2 * 4/2018 Mori ................. H02P 21/22
2011/0241579 A1 * 10/2011 Kimpara ............. H02P 21/0003
318/400.02
(Continued)

FOREIGN PATENT DOCUMENTS

| JP | 2001-245499 A | 9/2001 |
| JP | 5178768 B2 | 4/2013 |
| WO | 2016/143120 A1 | 9/2016 |

OTHER PUBLICATIONS

International Search report for PCT/JP2018/008384 dated, Jun. 5, 2018 (PCT/ISA/210).

*Primary Examiner* — Erick D Glass
(74) *Attorney, Agent, or Firm* — Sughrue Mion, PLLC; Richard C. Turner

(57) ABSTRACT

A control device applies voltages to an AC rotating machine based on voltage command values on stationary coordinates. Currents in a plurality phases flowing the rotating machine are detected as detection currents. Coordinate conversion is applied to those detection currents based on any phase in the rotating machine, for generate detection currents on rotational coordinates. Voltage command values on the rotational coordinates are generated based on current command values on the rotational coordinates and the detection currents. Coordinate conversion is applied to those voltage command values based on the any phase, for generate first voltage command values on the stationary coordinates. Phases of one of the first voltage command values and generated second voltage command values on the stationary coordinates are corrected to generate the second voltage command values. One of the second and the first voltage command values are selected as the voltage command values on the stationary coordinates.

7 Claims, 13 Drawing Sheets

(51) Int. Cl.
*H02P 21/22* (2016.01)
*B62D 5/04* (2006.01)

(56) References Cited

U.S. PATENT DOCUMENTS

| | | | |
|---|---|---|---|
| 2012/0268046 A1* | 10/2012 | Yamazaki | H02P 21/26 |
| | | | 318/400.02 |
| 2014/0292239 A1* | 10/2014 | Kato | H02P 21/22 |
| | | | 318/400.02 |
| 2018/0034397 A1 | 2/2018 | Furukawa | |
| 2018/0294755 A1* | 10/2018 | Mori | H02P 21/22 |
| 2021/0184604 A1* | 6/2021 | Wada | H02P 5/74 |

* cited by examiner

FIG. 6

| | TIME (SECONDS) | 0 | ΔT | 2ΔT | 3ΔT | 4ΔT | 5ΔT | 6ΔT | 7ΔT | ... |
|---|---|---|---|---|---|---|---|---|---|---|
| (a) | POSITION DETECTION UNIT 3 | EXECUTE | | EXECUTE | | EXECUTE | | EXECUTE | | ... |
| (b) | CURRENT DETECTION UNIT 4 | EXECUTE | | EXECUTE | | EXECUTE | | EXECUTE | | ... |
| (c) | FIRST COORDINATE CONVERSION UNIT 6 | EXECUTE | | EXECUTE | | EXECUTE | | EXECUTE | | ... |
| (d) | CURRENT CONTROL UNIT 7 | EXECUTE | | EXECUTE | | EXECUTE | | EXECUTE | | ... |
| (e) | SECOND COORDINATE CONVERSION UNIT 8 | EXECUTE | | EXECUTE | | EXECUTE | | EXECUTE | | ... |
| (f) | ANGULAR FREQUENCY CALCULATION UNIT 60 | EXECUTE | | EXECUTE | | EXECUTE | | EXECUTE | | ... |
| (g) | STORAGE UNIT 90 | STORE | HOLD | STORE | HOLD | STORE | HOLD | STORE | HOLD | ... |
| (h) | VOLTAGE COMMAND CALCULATION UNIT 91 | | EXECUTE | | EXECUTE | | EXECUTE | | EXECUTE | ... |
| (i) | | FIRST VOLTAGE COMMAND VALUES | SECOND VOLTAGE COMMAND VALUES | FIRST VOLTAGE COMMAND VALUES | SECOND VOLTAGE COMMAND VALUES | FIRST VOLTAGE COMMAND VALUES | SECOND VOLTAGE COMMAND VALUES | FIRST VOLTAGE COMMAND VALUES | SECOND VOLTAGE COMMAND VALUES | ... |
| (j) | VOLTAGE COMMAND OUTPUT UNIT 10 | | | | | | | | | ... |

FIG. 10

| | TIME (SECONDS) | 0 | ΔT | 2ΔT | 3ΔT | 4ΔT | 5ΔT | 6ΔT | 7ΔT | 8ΔT | 9ΔT | ... |
|---|---|---|---|---|---|---|---|---|---|---|---|---|
| (a) | | | | | | | | | | | | |
| (b) | POSITION DETECTION UNIT 3 | EXECUTE | | | | EXECUTE | | | | EXECUTE | | ... |
| (c) | CURRENT DETECTION UNIT 4 | EXECUTE | | | | EXECUTE | | | | EXECUTE | | ... |
| (d) | FIRST COORDINATE CONVERSION UNIT 6 | EXECUTE | | | | EXECUTE | | | | EXECUTE | | ... |
| (e) | CURRENT CONTROL UNIT 7 | EXECUTE | | | | EXECUTE | | | | EXECUTE | | ... |
| (f) | SECOND COORDINATE CONVERSION UNIT 8 | EXECUTE | | | | EXECUTE | | | | EXECUTE | | ... |
| (g) | ANGULAR FREQUENCY CALCULATION UNIT 60 | EXECUTE | | | | EXECUTE | | | | EXECUTE | | ... |
| (h) | STORAGE UNIT 90 | STORE | HOLD | HOLD | HOLD | STORE | HOLD | HOLD | HOLD | STORE | HOLD | ... |
| (i) | FIRST-TIME-POINT VOLTAGE COMMAND CALCULATION UNIT 911 | | EXECUTE | | | | EXECUTE | | | | EXECUTE | ... |
| (j) | SECOND-TIME-POINT VOLTAGE COMMAND CALCULATION UNIT 912 | | | EXECUTE | | | | EXECUTE | | | | ... |
| (k) | THIRD-TIME-POINT VOLTAGE COMMAND CALCULATION UNIT 913 | | | | EXECUTE | | | | EXECUTE | | | ... |
| (l) | SECOND VOLTAGE COMMAND SELECTION UNIT 914 | FIRST VOLTAGE COMMAND VALUES | 1ST-TIME-POINT VOLTAGE COMMAND VALUES | 2ND-TIME-POINT VOLTAGE COMMAND VALUES | 3RD-TIME-POINT VOLTAGE COMMAND VALUES | FIRST VOLTAGE COMMAND VALUES | 1ST-TIME-POINT VOLTAGE COMMAND VALUES | 2ND-TIME-POINT VOLTAGE COMMAND VALUES | 3RD-TIME-POINT VOLTAGE COMMAND VALUES | FIRST VOLTAGE COMMAND VALUES | 1ST-TIME-POINT VOLTAGE COMMAND VALUES | ... |
| (m) | VOLTAGE COMMAND OUTPUT UNIT 60 | FIRST VOLTAGE COMMAND VALUES | SECOND VOLTAGE COMMAND VALUES | SECOND VOLTAGE COMMAND VALUES | SECOND VOLTAGE COMMAND VALUES | FIRST VOLTAGE COMMAND VALUES | SECOND VOLTAGE COMMAND VALUES | SECOND VOLTAGE COMMAND VALUES | SECOND VOLTAGE COMMAND VALUES | FIRST VOLTAGE COMMAND VALUES | SECOND VOLTAGE COMMAND VALUES | ... |

FIG. 13

| | TIME (SECONDS) | 0 | ΔT | 2ΔT | 3ΔT | 4ΔT | 5ΔT | 6ΔT | 7ΔT | 8ΔT | 9ΔT | 10ΔT | 11ΔT | ... |
|---|---|---|---|---|---|---|---|---|---|---|---|---|---|---|
| (a) | POSITION DETECTION UNIT 3 | EXECUTE | | | | | EXECUTE | | | | | EXECUTE | | ... |
| (b) | CURRENT DETECTION UNIT 4 | EXECUTE | | | | | EXECUTE | | | | | EXECUTE | | ... |
| (c) | FIRST COORDINATE CONVERSION UNIT 6 | EXECUTE | | | | | EXECUTE | | | | | EXECUTE | | ... |
| (d) | CURRENT CONTROL UNIT 7 | EXECUTE | | | | | EXECUTE | | | | | EXECUTE | | ... |
| (e) | SECOND COORDINATE CONVERSION UNIT 8 | EXECUTE | | | | | EXECUTE | | | | | EXECUTE | | ... |
| (f) | ANGULAR FREQUENCY UNIT 60 | DELAY AND HOLD | DELAY AND HOLD | DELAY AND HOLD | DELAY AND HOLD | DELAY AND HOLD | DELAY AND HOLD | EXECUTE | EXECUTE | EXECUTE | EXECUTE | EXECUTE | EXECUTE | ... |
| (g) | VOLTAGE COMMAND DELAY-AND-HOLD CALCULATION UNITS 92, 93, and 94 | | EXECUTE | EXECUTE | EXECUTE | EXECUTE | | | | | | | | ... |
| (h) | VOLTAGE COMMAND CALCULATION UNIT 91 | | | | | | DELAY AND HOLD | DELAY AND HOLD | DELAY AND HOLD | DELAY AND HOLD | DELAY AND HOLD | DELAY AND HOLD | DELAY AND HOLD | ... |
| (i) | VOLTAGE COMMAND OUTPUT UNIT 10a | FIRST VOLTAGE COMMAND VALUES | SECOND VOLTAGE COMMAND VALUES | SECOND VOLTAGE COMMAND VALUES | SECOND VOLTAGE COMMAND VALUES | SECOND VOLTAGE COMMAND VALUES | FIRST VOLTAGE COMMAND VALUES | SECOND VOLTAGE COMMAND VALUES | SECOND VOLTAGE COMMAND VALUES | SECOND VOLTAGE COMMAND VALUES | SECOND VOLTAGE COMMAND VALUES | FIRST VOLTAGE COMMAND VALUES | SECOND VOLTAGE COMMAND VALUES | ... |

CONTROL DEVICE FOR AC ROTATING MACHINE, AND CONTROL DEVICE FOR ELECTRIC POWER STEERING

CROSS REFERENCE TO RELATED APPLICATIONS

This application is a National Stage of International Application No. PCT/JP2018/008384 filed Mar. 5, 2018.

TECHNICAL FIELD

The present invention relates to a control device for an AC rotating machine, which is configured to control the AC rotating machine, for example, a synchronous motor, and to a control device for an electric power steering system, which uses the control device for an AC rotating machine.

BACKGROUND ART

In control for an AC rotating machine, coordinates to be used to treat currents or voltages, which are vector quantities, are broadly classified into two types of coordinates, which are stationary coordinates and rotational coordinates. As the stationary coordinates, there are known three-phase AC coordinates directly treating values in three phases, for example, U, V, and W phases, two-phase AC coordinates to be used to observe a state on orthogonal stationary two-axis coordinates based on three-phase/two-phase conversion, and the like. As the rotational coordinates, orthogonal rotational two-axis coordinates are well known. Among those orthogonal rotational two-axis coordinates, there are known coordinates rotating synchronously with a rotation position of an AC rotating machine, coordinates rotating synchronously with a frequency command value, coordinates rotating synchronously with estimated rotor magnetic flux or induced voltages, and the like.

There is known a control device for an AC rotating machine configured to provide current command values on rotational coordinates when the AC rotating machine is driven, to thereby apply control so that current values on the rotational coordinates of the AC rotating machine match those current command values. Hitherto, in order to obtain the current values on the rotational coordinates of the AC rotating machine, there has been used a method involving detecting, by a current detector, current values of the AC rotating machine as current values on the stationary coordinates, and applying coordinate conversion to the detected current values. In this configuration, the control for the AC rotating machine is executed by calculating voltage command values on the rotational coordinates so that those current command values match the detected current values, and using voltage command values in the three phases on the stationary coordinates, which are obtained by applying coordinate conversion to the calculated voltage command values, and voltage command values in the three phases, which are calculated based on the current values detected by the current detector (for example, see Patent Literature 1).

The current detector is configured to detect currents in the three phases, for example, the U phase, the V phase, and the W phase. However, it is known that a phase having an undetectable current exists due to influence of switching noise depending on switching timings of switching elements configured to apply the voltages to the AC rotating machine. In this case, hitherto, on the basis of the fact that the sum of the currents in the three phases is zero, the current value in the phase having the undetectable current has been estimated from the current values in the phases having the detectable currents (for example, see Patent Literature 2).

CITATION LIST

Patent Literature

[PTL 1] JP 5178768 B2
[PTL 2] WO 2016/143120 A1

SUMMARY OF INVENTION

Technical Problem

A control device for an AC rotating machine is sometimes used for, for example, an electric power steering system mounted to a vehicle, for example, an automobile. Noise emitted from the AC rotating machine mounted to the vehicle may give a sense of discomfort to a driver. The noise emitted by this AC rotating machine includes noise caused by the voltage command values directed to the AC rotating machine.

A frequency of the noise caused by the voltage command values depends on a calculation frequency of the voltage command values. Therefore, the frequency of the noise is increased by increasing the calculation frequency of the voltage command values, that is, reducing an update cycle of the voltage command values to a short cycle. The sense of discomfort given to the driver by this noise can be reduced by increasing the frequency of the noise.

However, as the update cycle of the voltage command values directed to the AC rotating machine is reduced, a calculation amount per unit time required in order to update the voltage command values increases, and thus a load of the processing caused by the update becomes higher. As the load becomes higher, performance required of a processing device for executing the calculation, for example, a microcomputer, increases, which causes an increase in cost of the control device for an AC rotating machine. Thus, it is important to further suppress the calculation amount per unit time in order to suppress the cost.

A difference in phase between the voltages and the currents changes in accordance with a rotational speed of the AC rotating machine. Therefore, when the voltage command values in the three phases calculated based on the current values detected by the current detector are used to control the AC rotating machine, it is also required in practice to address the difference in phase between the voltages and the currents.

The present invention has been made in view of the above-mentioned problems, and therefore has an object to provide a control device for an AC rotating machine and a control device for an electric power steering, which are capable of reducing a sense of discomfort given to a human by noise of the AC rotating machine while reducing a calculation amount per unit time.

Solution to Problem

According to one embodiment of the present invention, there is provided a control device for an AC rotating machine, the control device for an AC rotating machine including: a voltage application unit configured to apply voltages to the AC rotating machine based on voltage command values on stationary coordinates; a current detection unit configured to detect currents in a plurality of phases flowing through the AC rotating machine; a first coordinate conversion unit configured to set the currents detected in the plurality of phases by the current detection unit as detection currents on the stationary coordinates, and apply coordinate conversion to the detection currents on the stationary coordinates based on any phase of the AC rotating machine, to thereby output detection currents on rotational coordinates; a current control unit configured to output voltage command values on the rotational coordinates based on current command values on the rotational coordinates, which specify currents to be supplied to the AC rotating machine, and on the detection currents on the rotational coordinates; a second coordinate conversion unit configured to apply coordinate conversion to the voltage command values on the rotational coordinates based on the any phase, to thereby output first voltage command values on the stationary coordinates; a voltage command generation unit configured to set one of the first voltage command values on the stationary coordinates and second voltage command values on the stationary coordinates generated immediately before as target command values, and correct phases of the target command values based on a change rate of the any phase, to thereby generate the second voltage command values on the stationary coordinates; and a voltage command output unit configured to select one of the second voltage command values on the stationary coordinates generated by the voltage command generation unit and the first voltage command values on the stationary coordinates generated by the second coordinate conversion unit, to thereby output the selected one of the second voltage command values and the first voltage command values as the voltage command values on the stationary coordinates.

Advantageous Effects of Invention

According to the present invention, it is possible to reduce a sense of discomfort given to a human by the noise of the AC rotating machine while reducing the calculation amount per unit time.

BRIEF DESCRIPTION OF DRAWINGS

FIG. 6 is an example of a time chart for showing operation examples of respective units included in the control device for an AC rotating machine according to the first embodiment of the present invention.

FIG. 10 is an example of a time chart for showing operation examples of respective units included in a control device for an AC rotating machine according to the second embodiment of the present invention.

FIG. 13 is an example of a time chart for showing operation examples of respective units included in the control device for an AC rotating machine according to the third embodiment of the present invention.

DESCRIPTION OF EMBODIMENTS

Figure 1:
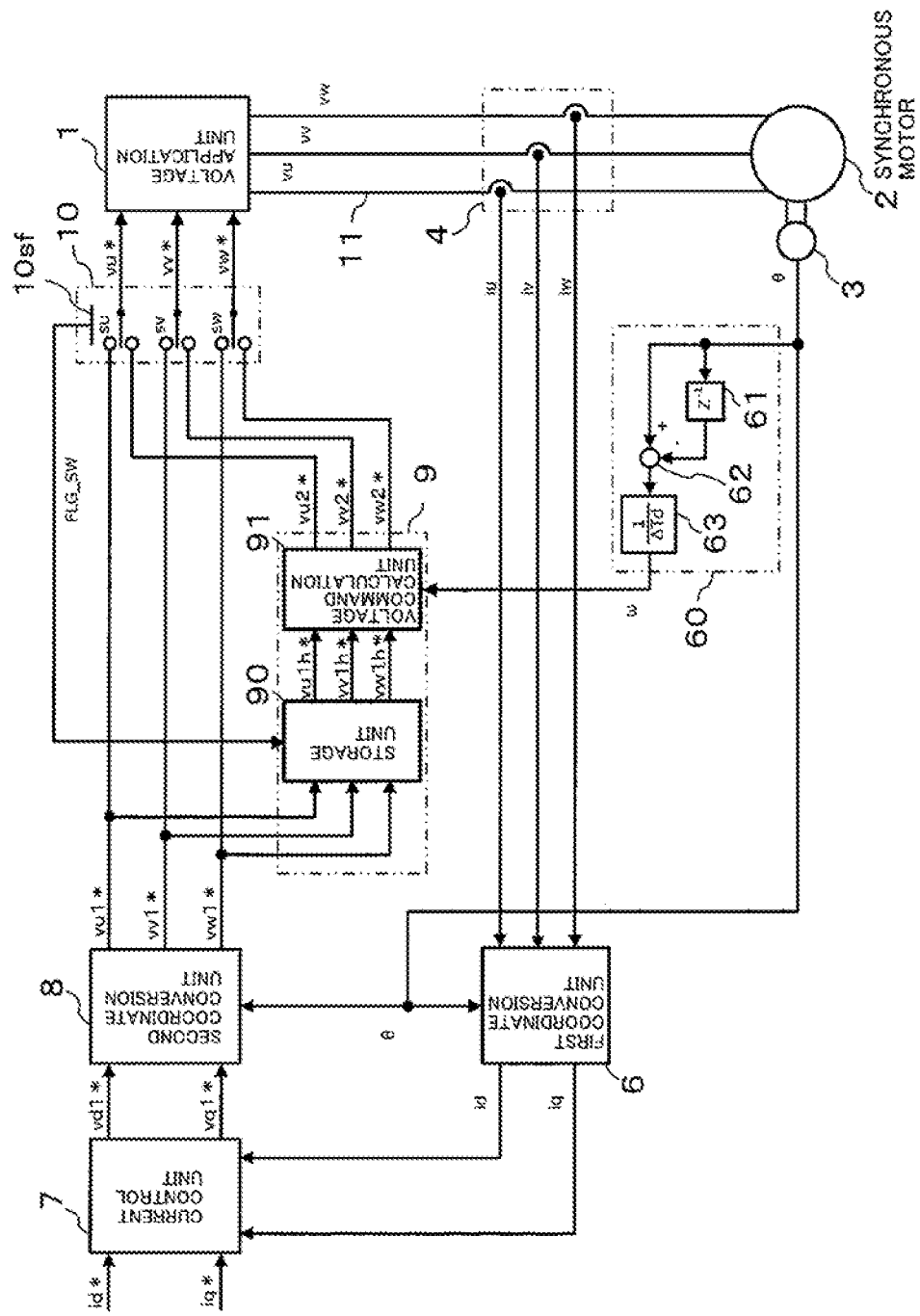
FIG. 1 is a block diagram for illustrating an overall configuration example of a control device for an AC rotating machine according to a first embodiment of the present invention.

A control device for an AC rotating machine and a control device for an electric power steering system according to each embodiment of the present invention are described below with reference to the drawings. Herein, the same components or components that correspond to each other are denoted by the same reference numerals.

First Embodiment

FIG. 1 is a block diagram for illustrating an overall configuration example of a control device for an AC rotating machine according to a first embodiment of the present invention. The control device for an AC rotating machine according to the first embodiment is configured to control and drive an AC rotating machine 2. The control device for an AC rotating machine includes a voltage application unit 1, a position detection unit 3, a current detection unit 4, a first coordinate conversion unit 6, a current control unit 7, a second coordinate conversion unit 8, a voltage command generation unit 9, and a voltage command output unit 10. The AC rotating machine 2 is a synchronous motor, for example, a synchronous electric motor. In FIG. 1, the AC rotating machine 2 is referred to as "synchronous motor."

The current detection unit 4 is configured to detect currents to be supplied to the AC rotating machine 2, to thereby output current values as digital signals. In order to output those current values, the current detection unit 4 incorporates analog-to-digital (A/D) conversion units. The position detection unit 3 incorporates a resolver-to-digital (R/D) converter, and is configured to output a rotation position of the AC rotating machine 2 as a digital signal.

The first coordinate conversion unit 6, the second coordinate conversion unit 8, the current control unit 7, the voltage command generation unit 9, an angular frequency calculation unit 60, and the voltage command output unit 10 are each implemented by a digital circuit. The digital circuit is specifically, for example, a microcomputer. Those respective units 6 to 10 and 60 are implemented by, for example, respective subprograms forming one program executed by the microcomputer. The processing device configured to execute the program may be a processing device different from the microcomputer, for example, a processing device including a central processing unit (CPU), a random access memory (RAM), and a read only memory (ROM).

In the first embodiment, coordinates including U, V, and W phases are used as stationary coordinates. The voltage application unit 1 is connected to the AC rotating machine 2 through three-phase current supply lines 11, and is configured to apply three-phase AC voltages vu, vv, and vw to the AC rotating machine 2 through the three-phase power supply lines 11. The three-phase AC voltages vu, vv, and vw include a U-phase AC voltage vu, a V-phase AC voltage vv, and a W-phase AC voltage vw.

The voltage application unit 1 is configured to input digital three-phase voltage command values vu*, vv*, and vw* from the voltage command output unit 10, and to convert an internal bus voltage to the three-phase AC voltages vu, vv, and vw based on the three-phase voltage command values vu*, vv*, and vw*. After that, the voltage application unit 1 applies the converted three-phase AC voltages vu, vv, and vw to the AC rotating machine 2. The three-phase voltage command values vu*, vv*, and vw* are voltage command values on the stationary coordinates, and include a U-phase voltage command value vu*, a V-phase voltage command value vv*, and a W-phase voltage command value vw*.

A well-known technology can be applied to the voltage application unit 1. Therefore, a detailed description is omitted. However, for example, the voltage application unit 1 includes a plurality of semiconductor switches capable of on/off control, and is configured to use the three-phase voltage command values vu*, vv*, and vw* to apply the on/off control to the respective semiconductor switches, to thereby generate three-phase AC voltages vu, vv, and vw.

When the voltage application unit 1 applies the three-phase AC voltages vu, vv, and vw to the AC rotating machine 2, relative differences in electric potential among the three-phase AC voltages vu, vv, and vw are only required to substantially match relative differences in electric potential among the three-phase voltage command values vu*, vv*, and vw*. Therefore, voltage values for increasing a voltage utilization factor may be added to the three-phase voltage command values vu*, vv*, and vw*. Moreover, correction voltage values resulting from on-voltage values or dead times of the respective semiconductor switches may be added to the respective three-phase voltage command values vu*, vv*, and vw*.

The AC rotating machine 2 is more specifically a permanent magnet type synchronous motor, such as a surface magnet type synchronous motor or an embedded magnet type synchronous motor. The AC rotating machine 2 may be, for example, a reluctance synchronous motor, which does not use a magnet for a rotor, or a field winding type synchronous motor, which has a field winding circuit on the secondary side.

The position detection unit 3 is configured to detect a rotation position $\theta$ of the AC rotating machine 2. A well-known technology can be applied also to the position detection unit 3. Therefore, although a detailed description is omitted, the position detection unit 3 includes, for example, a resolver, which is a rotation angle sensor coupled to a rotation shaft of the AC rotating machine 2, and is configured to generate a signal in accordance with the rotation position $\theta$, which is an angle of a rotor of the AC rotating machine 2. The signal in accordance with the rotation position $\theta$ is output as a digital signal indicating the rotation position $\theta$ by the R/D converter incorporated in the position detection unit 3. A Hall element, a magnetoresistive element, or the like may be employed in place of the R/D converter. The rotation position $\theta$ may be estimated based on a well-known technology.

A well-known technology can also be applied to the current detection unit 4. Therefore, although a detailed description is omitted, for example, the current detection unit 4 is coupled to the three-phase power supply lines 11, and is configured to detect three-phase AC currents flowing through the AC rotating machine 2 based on the three-phase AC voltages vu, vv, and vw, to output three-phase detection currents iu, iv, and iw, which are detection results, as digital signals. Therefore, the current detection unit 4 includes, for example, a current sensor and an A/D converter for each phase.

Moreover, the current detection unit 4 includes a calculation unit configured to estimate, when there is a phase having an undetectable AC current, the value of the AC current in the phase having the undetectable current based on calculation. This calculation unit is configured to calculate, for example, based on a fact that a sum of the three-phase detection currents iu, iv, and iw is zero, the current in the phase unavailable for the detection from the currents in the two phases available for the detection. Alternatively, the calculation unit may be configured to use the current detected in the past in the phase unavailable for the detection and the rotation position $\theta$ to calculate the current in this phase (for example, see Patent Literature 2).

In the first embodiment, the current detection unit 4 is configured to detect the three-phase AC currents from the three-phase power supply lines 11 connecting the voltage application unit 1 and the AC rotating machine 2 to each other, but the current detection unit 4 may be configured to detect the three-phase AC currents from a location different from the three-phase power supply lines 11. For example, the current detection unit 4 may be configured to detect bus currents inside the voltage application unit 1, to thereby output the detected bus currents as the three-phase detection currents iu, iv, and iw.

The current detection unit 4 is configured to output the three-phase detection currents iu, iv, and iw at each first operation timing repeated at freely-set predetermined cycles $\Delta T1$. As a result, the three-phase detection currents iu, iv, and iw are updated at each first operation timing. The updated three-phase detection currents iu, iv, and iw are held until the arrival of the next first operation timing. The cycle $\Delta T1$ of the first operation timing is hereinafter referred to as "first operation cycle $\Delta T1$." This first operation cycle $\Delta T1$ is the detection cycle for detecting the currents, is also a calculation cycle for executing the calculation, and is set to, for example, $100 \times 10^{-6}$ (seconds) to $500 \times 10^{-6}$ (seconds). The three-phase detection currents iu, iv, and iw are detection currents on the stationary coordinates, and include a U-phase detection current iu, a V-phase detection current iv, and a W-phase detection current iw.

The position detection unit 3 is configured to output the rotation position $\theta$ at each first operation timing repeated at the first operation cycles $\Delta T1$. The rotation position $\theta$ is updated at each first operation timing. The updated rotation position $\theta$ is held until the arrival of the next first operation timing. The rotation position $\theta$ is a position signal on the stationary coordinates, and is output to the first coordinate conversion unit 6 and the second coordinate conversion unit 8.

The first coordinate conversion unit 6 is configured to apply coordinate conversion to the three-phase detection currents iu, iv, and iw based on any phase, to thereby output two-phase detection currents id and iq. In the first embodiment, the rotation position $\theta$ output from the position detection unit 3 is used as the any phase used for the coordinate conversion. A phase different from the rotation position $\theta$ may be employed as the any phase. For example, the any phase may be a phase of any one of the phases of the currents supplied to the AC rotating machine 2 or the voltages applied to the AC rotating machine 2.

The first coordinate conversion unit 6 is configured to convert the three-phase detection currents iu, iv, and iw from the current detection unit 4 to the two-phase detection currents id and iq based on the rotation position $\theta$ output from the position detection unit 3. The first coordinate conversion unit 6 is configured to output the two-phase detection currents id and iq at each first operation timing repeated at the first operation cycles $\Delta T1$. The two-phase detection currents id and iq are updated at each first operation timing. The updated two-phase detection currents id and iq are held until the arrival of the next first operation timing. The two-phase detection currents id and iq are digital signals of the detection currents on the rotational coordinates, and include a d-axis component id on a d axis and a q-axis component iq on a q axis, which are orthogonal to each other.

The current control unit 7 is configured to input two-phase current command values id* and iq* on the rotational coordinates from the outside, and to input the two-phase detection currents id and iq on the rotational coordinates from the first coordinate conversion unit 6. The two-phase current command values id* and iq* are digital signals of current command values on the rotational coordinates indicating currents to be supplied to the AC rotating machine 2, and include a d-axis component id* on the d axis and a q-axis component iq* on the q axis, which are orthogonal to each other. The two-phase detection currents id and iq are supplied from the first coordinate conversion unit 6 to the current control unit 7. The current control unit 7 is configured to output digital two-phase voltage command values vd1* and vq1* on the rotational coordinates based on those two-phase current command values id* and iq' on the rotational coordinates and the two-phase detection currents id and iq on the rotational coordinates. The two-phase voltage command values vd1* and vq1* include a d-axis component vd1* on the d axis and a q-axis component vq1* on the q axis, which are orthogonal to each other.

The current control unit 7 is configured to output the two-phase voltage command values vd1* and vq1* at each first operation timing repeated at the first operation cycles $\Delta T1$. In other words, the two-phase voltage command values vd1* and vq1* are updated at each first operation timing repeated at the first operation cycles $\Delta T1$. The updated two-phase voltage command values vd1* and vq1* are held until the arrival of the next first operation timing.

The second coordinate conversion unit 8 is configured to apply coordinate conversion to the two-phase voltage command values vd1* and vq1* on the rotational coordinates input from the current control unit 7 based on the rotation position $\theta$ output from the position detection unit 3, to thereby output first three-phase voltage command values vu1*, vv1*, and vw1*. Those first three-phase voltage command values vu1*, vv1*, and vw1* are digital signals of voltage command values on the stationary coordinates, and include a first U-phase voltage command value vu1*, a first V-phase voltage command value vv1*, and a first W-phase voltage command value vw1*. Those first three-phase voltage command values vu1*, vv1*, and vw1* are supplied to the voltage command generation unit 9 and the voltage command output unit 10.

The updated rotation position $\theta$ is input to the second coordinate conversion unit 8 at each first operation timing repeated at the first operation cycles $\Delta T1$. The second coordinate conversion unit 8 is configured to output the first three-phase voltage command values vu1*, vv1*, and vw1* obtained based on the updated rotation position $\theta$ at each first operation timing. As a result, the first three-phase voltage command values vu1*, vv1*, and vw1* are updated at each first operation timing repeated at the first operation cycles $\Delta T1$. The updated first three-phase voltage command values vu1*, vv1*, and vw1* are held until the arrival of the next first operation timing.

The angular frequency calculation unit 60 is configured to input the rotation position $\theta$ from the position detection unit 3, and to calculate an angular frequency $\omega$, which is a change rate of the input rotation position $\theta$. For this purpose, the angular frequency calculation unit 60 includes a delay-and-hold operator 61, a subtractor 62, and a proportional gain multiplier 63.

In the angular frequency calculation unit 60, the rotation position $\theta$ output by the position detection unit 3 is input to the delay-and-hold operator 61. The delay-and-hold operator 61 is configured to delay the input by a delay time interval $\Delta Td$, and to then hold the delayed input. The delay time interval $\Delta Td$ is, for example, a period having the same length as that of the first operation cycle $\Delta T1$. The subtractor 62 is configured to input the rotation position $\theta$ from the position detection unit 3 and the rotation position $\theta$ delayed by the delay-and-hold operator 61, to subtract the rotation position $\theta$ that is the delay time interval $\Delta Td$ earlier than the current rotation position $\theta$, and to output a subtraction result to the proportional gain multiplier 63.

The proportional gain multiplier 63 is configured to multiply the output of the subtractor 62 by ($1/\Delta Td$), to thereby obtain a change in rotation position $\theta$ per unit time to output the obtained change as the angular frequency $\omega$, which is the change rate of the rotation position $\theta$. The angular frequency co is output as a digital signal to the voltage command generation unit 9. In the first embodiment, the delay time interval $\Delta Td$ is set as the first operation cycle $\Delta T1$ as described above so that the angular frequency calculation unit 60 outputs the angular frequency $\omega$ at each first operation timing repeated at the first operation cycles $\Delta T1$.

The voltage command generation unit 9 is configured to generate second three-phase voltage command values vu2*, vv2*, and vw2* based on the first three-phase voltage command values vu1*, vv1*, and vw1* from the second coordinate conversion unit and the angular frequency ω from the angular frequency calculation unit 60.

The voltage command output unit 10 is configured to input the first three-phase voltage command values vu1*, vv1*, and vw1* supplied from the second coordinate conversion unit 8 and the second three-phase voltage command values vu2*, vv2*, and vw2* supplied from the voltage command generation unit 9, to select any one of the two groups of command values, and to output the selected one group of command values as the three-phase voltage command values vu*, vv*, and vw* to the voltage application unit 1. In this case, an operation cycle for selecting the first three-phase voltage command values vu1*, vv1*, and vw1* and an operation cycle for selecting the second three-phase voltage command values vu2*, vv2*, and vw2* are different from each other. More specifically, the voltage command output unit 10 is configured to select the first three-phase voltage command values vu1*, vv1*, and vw1* output from the second coordinate conversion unit 8 correspondingly to each first operation timing repeated at the first operation cycles ΔT1. Moreover, the voltage command output unit 10 is configured to select the second three-phase voltage command values vu2*, vv2*, and vw2* output from the voltage command generation unit 9 correspondingly to each second operation timing repeated at second operation cycles ΔT2. As a result, the three-phase voltage command values vu*, vv*, and vw* are always continuously output to the voltage application unit 1.

This second operation cycle ΔT2 is set shorter than the first operation cycle ΔT1. This second operation cycle ΔT2 is practically set to, for example, ½ time to ¹⁄₂₀ times the first operation cycle ΔT1. However, the second operation cycle ΔT2 is only required to be shorter than the first operation cycle ΔT1, and is not limited to this practical range. Moreover, it is preferred that the second operation cycle ΔT2 be set to 1/n time (n: integer) the first operation cycle ΔT1, but the setting is not limited to this example. As a result of setting the second operation cycle ΔT2 shorter than the first operation cycle ΔT1, one or more second operation timings exist between the two first operation timings next to each other.

When the first operation timing and the second operation timing match each other, in the first embodiment, the first operation timing is prioritized, and is treated in such a manner that only the first operation timing is reached. That is, only the processing at the first operation timing is executed, and the processing at the second operation timing is not executed.

Moreover, when one second operation timing is set to exist between the two first operation timings next to each other, the first operation cycle ΔT1 and the second operation cycle £T2 may be the same cycles, and the first operation timing and the second operation timing may be different timings. In view of this fact, synchronization between the first operation timing and the second operation timing is not always required.

The voltage command output unit 10 includes a U-phase switch su, a V-phase switch sv, and a W-phase switch sw in order to select any one of the first three-phase voltage command values vu1*, vv1*, and vw1* and the second three-phase voltage command values vu2*, vv2*, and vw2*. The first U-phase voltage command value vu1* and the second U-phase voltage command value vu2* are input to the U-phase switch su. This U-phase switch su is configured to output any one of the first U-phase voltage command value vu1* and the second U-phase voltage command value vu2* as the U-phase voltage command value vu*.

The first V-phase voltage command value vv1* and the second V-phase voltage command value vv2* are input to the V-phase switch sv. This V-phase switch sv is configured to output any one of the first V-phase voltage command value vv1* and the second V-phase voltage command value vv2* as the V-phase voltage command value vv*. The first W-phase voltage command value vw1* and the second W-phase voltage command value vw2* are input to the W-phase switch sw. This W-phase switch sw is configured to output any one of the first W-phase voltage command value vw1* and the second W-phase voltage command value vw2* as the W-phase voltage command value vw*.

The switches su, sv, and sw are operationally associated with one another. Therefore, for example, when the U-phase switch su selects the first U-phase voltage command value vu1*, the V-phase switch sv selects the first V-phase voltage command value vv1*, and the W-phase switch sw selects the first W-phase voltage command value vw1*. Similarly, for example, when the U-phase switch su selects the second U-phase voltage command value vu2*, the V-phase switch sv selects the second V-phase voltage command value vv2*, and the W-phase switch sw selects the second W-phase voltage command value vw2*. Those selection results are held until the first operation timing or the second operation timing arrives next.

The voltage command output unit 10 further includes a switch flag output unit 10sf. This switch flag output unit 10sf is configured to output a switch flag FLG_SW, which is a signal, to the voltage command generation unit 9 in accordance with the selection state of the voltage command output unit 10. This switch flag FLG_SW is switched between, for example, "TRUE" and "FALSE". For example, the switch flag output unit 10sf sets the switch flag FLG_SW to "TRUE" under the state in which the first three-phase voltage command values vu1*, vv1*, and vw1* are selected, and sets the switch flag FLG_SW to "FALSE" under the state in which the second three-phase voltage command values vu2*, vv2*, and vw2* are selected.

The voltage command generation unit 9 specifically includes a storage unit 90 and a voltage command calculation unit 91. The first three-phase voltage command values vu1*, vv1*, and vw1* from the second coordinate conversion unit 8 and the switch flag FLG_SW from the voltage command output unit 10 are input to the storage unit 90.

As described above, the switch flag FLG_SW becomes "TRUE" correspondingly to each first operation timing repeated at the first operation cycles ΔT1. When the switch flag FLG_SW becomes "TRUE", the storage unit 90 stores the first three-phase voltage command values vu1*, vv1*, and vw1* output from the second coordinate conversion unit 8. As a result, the first three-phase voltage command values vu1*, vv1*, and vw1* generated by the second coordinate conversion unit 8 at each first operation cycle ΔT1 are stored in the storage unit 90.

As described above, the switch flag FLG_SW becomes "FALSE" correspondingly to each second operation timing repeated at the second operation cycles ΔT2. One or more second operation timings exist between the two first operation timings next to each other. When the switch flag FLG_SW becomes "FALSE", the storage unit 90 outputs the first three-phase voltage command values vu1*, vv1*, and vw1* stored at the first operation timing immediately before the current first operation timing as three-phase memory voltage command values vu1h*, vv1h*, and vw1h*. The three-phase memory voltage command values vu1h*, vv1h*, and vw1h* are digital signals of the voltage command values on the stationary coordinates, and include a U-phase memory voltage command value vu1h*, a V-phase memory voltage command value vv1h*, and a W-phase memory voltage command value vw1h*.

The three-phase memory voltage command values vu1h*, vv1h*, and vw1h* from the storage unit 90 and the angular frequency ω from the angular frequency calculation unit 60 are output to the voltage command calculation unit 91. The voltage command calculation unit 91 is configured to correct phases of the three-phase memory voltage command values vu1h*, vv1h*, and vw1h* based on the angular frequency ω, to output the three-phase memory voltage command values vu1h*, vv1h*, and vw1h* after the correction as the second three-phase voltage command values vu2*, vv2*, and vw2* at each second operation timing. As a result, the second three-phase voltage command values vu2*, vv2*, and vw2* are updated at each second operation timing. The updated second three-phase voltage command values vu2*, vv2*, and vw2* are held until the second operation timing arrives next. The second three-phase voltage command values vu2*, vv2*, and vw2* are output to the voltage command output unit 10. The second three-phase voltage command values vu2*, vv2*, and vw2* are digital signals of voltage command values on the stationary coordinates, and include the second U-phase voltage command value vu2*, the second V-phase voltage command value vv2*, and the second W-phase voltage command value vw2*.

Figure 2:
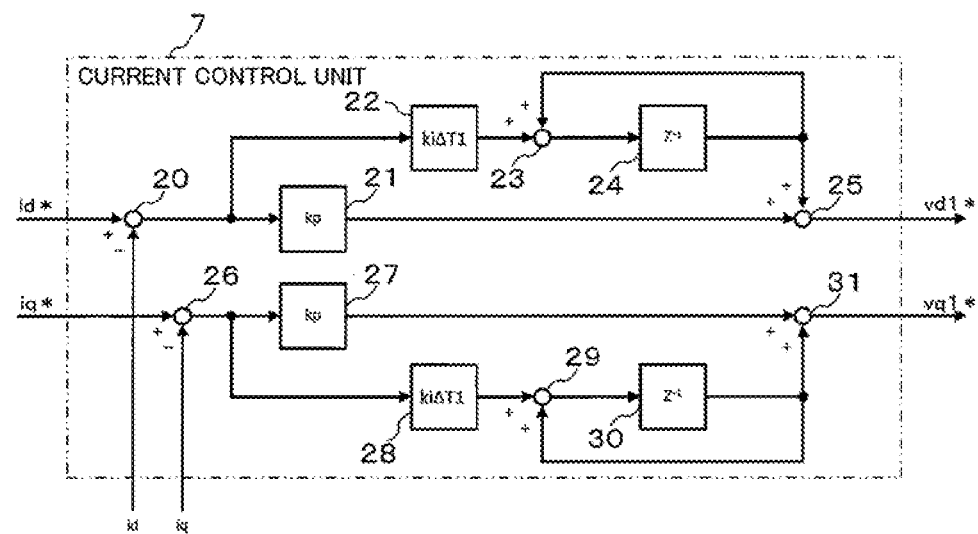
FIG. 2 is a block diagram for illustrating an internal configuration example of a current control unit 7 employed in the control device for an AC rotating machine according to the first embodiment of the present invention.

FIG. 2 is a block diagram for illustrating an internal configuration example of the current control unit 7 employed in the control device for an AC rotating machine according to the first embodiment of the present invention. As illustrated in FIG. 2, this current control unit 7 includes subtractors 20 and 26, proportional gain multipliers 21 and 27, integral gain multipliers 22 and 28, adders 23 and 29, delay-and-hold operators 24 and 30, and adders 25 and 31.

The subtractor 20 is configured to subtract the d-axis component id of the two-phase detection currents id and iq on the rotational coordinates from the d-axis component id* of the two-phase current command values id* and iq* on the rotational coordinates, to output a d-axis current difference (id*−id) to the proportional gain multiplier 21 and the integral gain multiplier 22. The proportional gain multiplier 21 is configured to multiply the d-axis current difference (id*−id) by, for example, a proportional gain kp, which is a fixed value, to thereby output the product. The integral gain multiplier 22 is configured to multiply the d-axis current difference (id*−id) by an integral gain kiΔT1, to thereby output the product. The adder 23 is configured to add the output of the integral gain multiplier 22 and an output of the delay-and-hold operator 24 to each other, to thereby output the sum to the delay-and-hold operator 24. The delay-and-hold operator 24 is configured to delay the input by a delay time interval corresponding to the first operation cycle ΔT1, and holds the output of the adder 23.

As described above, the result kiΔT1 (id*−id) of the multiplication by the integral gain multiplier 22 and the output of the delay-and-hold operator 24 are added to each other by the adder 23. A result of the addition is delayed by the delay time interval corresponding to the first operation cycle ΔT1, and is newly held by the delay-and-hold operator 24 after that. Therefore, the adder 23 is configured to add the output of the integral gain multiplier 22 and the output of the delay-and-hold operator 24 to each other, to thereby output the d-axis component vd1* of the two-phase voltage command values vd1* and vq1* on the rotational coordinates. This d-axis component vd1*, namely, the result of the addition of components of change simulated by each of the proportional gain kp and the integral gain kiΔT1 to the d-axis current difference (id*−id), corresponds to a result of proportional integral of the d-axis current difference (id*−id) output by the subtractor 20. The delay-and-hold operator 24 holds the d-axis component vd1*.

Similarly, the subtractor 26 is configured to subtract the q-axis component iq of the two-phase detection currents id and iq on the rotational coordinates from the q-axis component iq* of the two-phase current command values id* and iq* on the rotational coordinates, to output a q-axis current difference (iq*−iq) to the proportional gain multiplier 27 and the integral gain multiplier 28. The proportional gain multiplier 27 is configured to multiply the q-axis current difference (iq*−iq) by a proportional gain kp, to thereby output the product. The integral gain multiplier 28 is configured to multiply the q-axis current difference (iq*−iq) by an integral gain kiΔT1, to thereby output the product. The adder 29 is configured to add the output of the integral gain multiplier 28 and an output of the delay-and-hold operator 30 to each other, to thereby output the sum to the delay-and-hold operator 30. The delay-and-hold operator 30 is configured to delay the input by a delay time interval corresponding to the first operation cycle ΔT1, and holds the output.

As described above, the result kiΔT1(iq*−iq) of the multiplication by the integral gain multiplier 28 and the output of the delay-and-hold operator 30 are added to each other by the adder 29. A result of the addition is delayed by the delay time interval corresponding to the first operation cycle ΔT1, and is newly held by the delay-and-hold operator 30 after that. Therefore, the adder 29 is configured to add the output of the integral gain multiplier 28 and the output of the delay-and-hold operator 30 to each other, to thereby output the q-axis component vq1* of the two-phase voltage command values vd1* and vq1* on the rotational coordinates. This q-axis component vq1*, namely, the result of the addition of components of change simulated by each of the proportional gain kp and the integral gain kiΔT1 to the q-axis current difference (iq*−iq), corresponds to a result of proportional integral of the q-axis current difference (iq*−iq) output by the subtractor 26. The delay-and-hold operator 30 holds the q-axis component vq1*.

Figure 3:
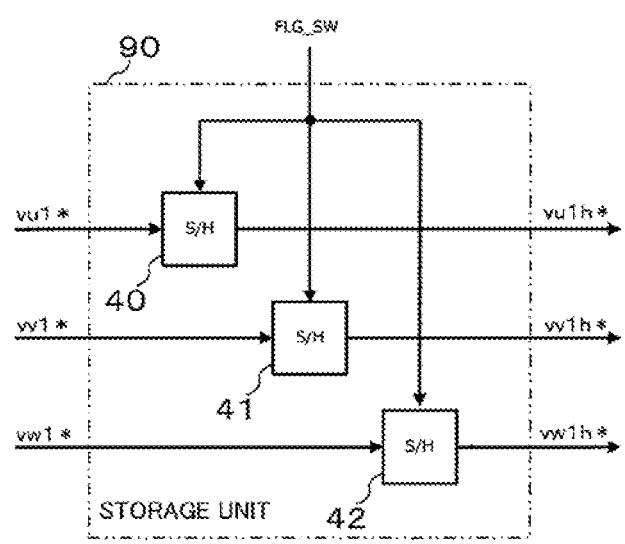
FIG. 3 is a block diagram for illustrating a configuration example of a storage unit included in a voltage command generation unit mounted in the control device for an AC rotating machine according to the first embodiment of the present invention.

FIG. 3 is a block diagram for illustrating a configuration example of the storage unit 90 of the voltage command generation unit 9 mounted in the control device for an AC rotating machine according to the first embodiment of the present invention. As illustrated in FIG. 3, the storage unit 90 includes sample-and-hold devices 40 to 42 for the respective phases. The sample-and-hold devices 40 to 42 are each controlled in accordance with the switch flag FLG_SW output from the switch flag output unit 10sf of the voltage command output unit 10.

The sample-and-hold device 40 is configured to sample and hold the first U-phase voltage command value vu1* when the switch flag FLG_SW becomes "TRUE", to thereby store and hold this first U-phase voltage command value vu1* as the U-phase memory voltage command value vu1h*. This sample-and-hold device 40 is configured to output the stored and held U-phase memory voltage command value vu1h* when the switch flag FLG_SW becomes "FALSE".

Similarly, the sample-and-hold device 41 is configured to sample and hold the first V-phase voltage command value vv1* when the switch flag FLG_SW becomes "TRUE", to thereby store and hold this first V-phase voltage command value vv1* as the V-phase memory voltage command value vv1h*. This sample-and-hold device 41 is configured to output the stored and held V-phase memory voltage command value vv1h* when the switch flag FLG_SW becomes "FALSE".

Similarly, the sample-and-hold device 42 is configured to sample and hold the first W-phase voltage command value vw1* when the switch flag FLG_SW becomes "TRUE", to thereby store and hold this first W-phase voltage command value vw1* as the W-phase memory voltage command value vw1h*. This sample-and-hold device 42 is configured to output the stored and held W-phase memory voltage command value vw1h* when the switch flag FLG_SW becomes "FALSE".

Figure 4:
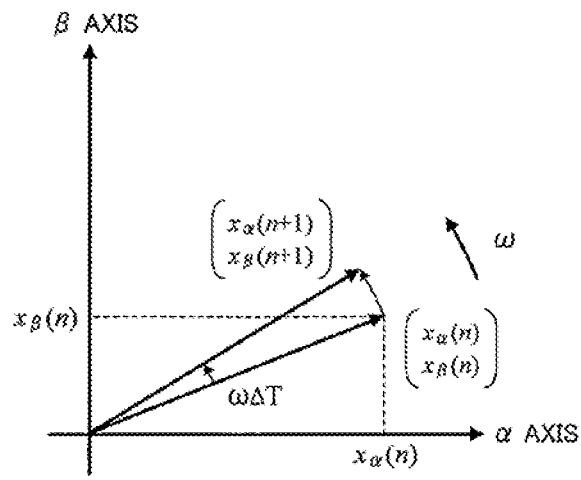
FIG. 4 is an explanatory graph for showing a principle of phase correction executed in a voltage command calculation unit 91.

Before description of an operation of the voltage command calculation unit 91, description is now given of a principle of phase correction. FIG. 4 is an explanatory graph for showing the principle of the phase correction executed in the voltage command calculation unit 91. A state "x" of a rotation at an angular frequency ω is plotted. In this representation, for the sake of convenience, stationary two-axis coordinates (α axis and β axis, obtained by well-known three-phase/two-phase conversion are used as the stationary coordinates in place of the three-phase coordinates, and the state "x" is plotted on those stationary two-phase coordinates. In this representation, the angular frequency ω may be the angular frequency ω output by the angular frequency calculation unit 60, but may be different from that angular frequency ω. Moreover, a very short period ΔT may also be different from a reference operation cycle ΔT described below.

An α-axis component in the state "x" at a certain time point is indicated as $x_\alpha(n)$. A β-axis component is indicated as $x_\beta(n)$. Moreover, when the very short period ΔT elapses from the certain time point, the α-axis component in the state "x" is indicated as $x_\alpha(n+1)$, and the β-axis component is indicated as $x_\beta(n+1)$. The state "x" is rotating at the angular frequency ω, and a relationship given by Expression (1) below is satisfied between $x_\alpha(n)$ and $x_\beta(n)$, and $x_\alpha(n+1)$ and $x_\beta(n+1)$.

$$\begin{pmatrix} x_\alpha(n+1) \\ x_\beta(n+1) \end{pmatrix} = \begin{pmatrix} \cos(\omega\Delta T) & -\sin(\omega\Delta T) \\ \sin(\omega\Delta T) & \cos(\omega\Delta T) \end{pmatrix} \begin{pmatrix} x_\alpha(n) \\ x_\beta(n) \end{pmatrix} \quad (1)$$

When it is also assumed that ωΔT is also very small, approximations given by Expression (2) and Expression (3) below are satisfied.

$$\cos(\omega\Delta T) \approx 1 \quad (2)$$

$$\sin(\omega\Delta T) \approx \omega\Delta T \quad (3)$$

Expression (4) below is obtained by assigning Expression (2) and Expression (3) to Expression (1).

$$\begin{pmatrix} x_\alpha(n+1) \\ x_\beta(n+1) \end{pmatrix} = \begin{pmatrix} 1 & -\omega\Delta T \\ \omega\Delta T & 1 \end{pmatrix} \begin{pmatrix} x_\alpha(n) \\ x_\beta(n) \end{pmatrix} \quad (4)$$

Expression (4) corresponds to a change in the state "x" rotating at the angular frequency ω represented on the stationary two-axis coordinates (α axis and β axis) when the very short period ΔT elapses. The state "x" on the stationary three-phase coordinates is given by Expression (5) below based on Expression (1) and Expression (4).

$$\begin{pmatrix} x_u(n+1) \\ x_v(n+1) \\ x_w(n+1) \end{pmatrix} = \left( \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \right) \begin{pmatrix} \cos(\omega\Delta T) & -\sin(\omega\Delta T) \\ \sin(\omega\Delta T) & \cos(\omega\Delta T) \end{pmatrix} \quad (5)$$

$$\left( \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \right) \begin{pmatrix} x_u(n) \\ x_v(n) \\ x_w(n) \end{pmatrix}$$

$$= \left( \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \right) \begin{pmatrix} 1 & -\omega\Delta T \\ \omega\Delta T & 1 \end{pmatrix}$$

$$\left( \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \right) \begin{pmatrix} x_u(n) \\ x_v(n) \\ x_w(n) \end{pmatrix}$$

$$= \begin{pmatrix} \frac{2}{3} & -\frac{1+\sqrt{3}\,\omega\Delta T}{3} & -\frac{1-\sqrt{3}\,\omega\Delta T}{3} \\ -\frac{1-\sqrt{3}\,\omega\Delta T}{3} & \frac{2}{3} & -\frac{1+\sqrt{3}\,\omega\Delta T}{3} \\ -\frac{1+\sqrt{3}\,\omega\Delta T}{3} & -\frac{1-\sqrt{3}\,\omega\Delta T}{3} & \frac{2}{3} \end{pmatrix}$$

Expression (5) can be transformed to Expression (6) below in consideration of a relationship of xu(n)+xv(n)+xw(n)=0.

$$\begin{pmatrix} x_u(n+1) \\ x_v(n+1) \\ x_w(n+1) \end{pmatrix} = \begin{pmatrix} \frac{2}{3} & -\frac{1+\sqrt{3}\,\omega\Delta T}{3} & -\frac{1-\sqrt{3}\,\omega\Delta T}{3} \\ -\frac{1-\sqrt{3}\,\omega\Delta T}{3} & \frac{2}{3} & -\frac{1+\sqrt{3}\,\omega\Delta T}{3} \\ -\frac{1+\sqrt{3}\,\omega\Delta T}{3} & -\frac{1-\sqrt{3}\,\omega\Delta T}{3} & \frac{2}{3} \end{pmatrix} \quad (6)$$

$$\begin{pmatrix} x_u(n) \\ x_v(n) \\ x_w(n) \end{pmatrix} +$$

$$\frac{1}{3} \begin{pmatrix} 1 & 1 & 1 \\ 1 & 1 & 1 \\ 1 & 1 & 1 \end{pmatrix} \begin{pmatrix} x_u(n) \\ x_v(n) \\ x_w(n) \end{pmatrix}$$

$$= \begin{pmatrix} 1 & -\frac{\omega\Delta T}{3} & \frac{\omega\Delta T}{3} \\ \frac{\omega\Delta T}{3} & 1 & -\frac{\omega\Delta T}{3} \\ -\frac{\omega\Delta T}{3} & \frac{\omega\Delta T}{3} & 1 \end{pmatrix} \begin{pmatrix} x_u(n) \\ x_v(n) \\ x_w(n) \end{pmatrix}$$

As described above, x(n+1) at the time when the very short period ΔT elapses can be obtained based on the state x(n) rotating at the angular frequency ω on the stationary three-phase coordinates as given by Expression (5) or Expression (6).

A calculation amount is smaller in the case of Expression (5) than in the case of Expression (6) when the angular frequency ω is given. Therefore, the voltage command calculation unit 91 in the first embodiment is configured to correct the respective phases of the three-phase memory voltage command values vu1h*, vv1h*, and vw1h* on the stationary coordinates output by the storage unit 90 based on Expression (6), to output the three-phase memory voltage command values vu1h*, vv1h*, and vw1h* after the correction as the second three-phase voltage command values vu2*, vv2*, and vw2* on the stationary coordinates.

The approximation given by Expression (4) is used in the first embodiment, but Expression (5), which is the calculation expression for the phase correction, may be used in place of Expression (4) for the approximation. Similarly, the approximation given by Expression (2) may be replaced by, for example, the approximation of "$\cos(\omega \Delta T) \approx 1-(\omega \Delta T)^2 \div 2$" based on the Maclaurin's expansion, to thereby derive an expression for the phase correction.

Figure 5:
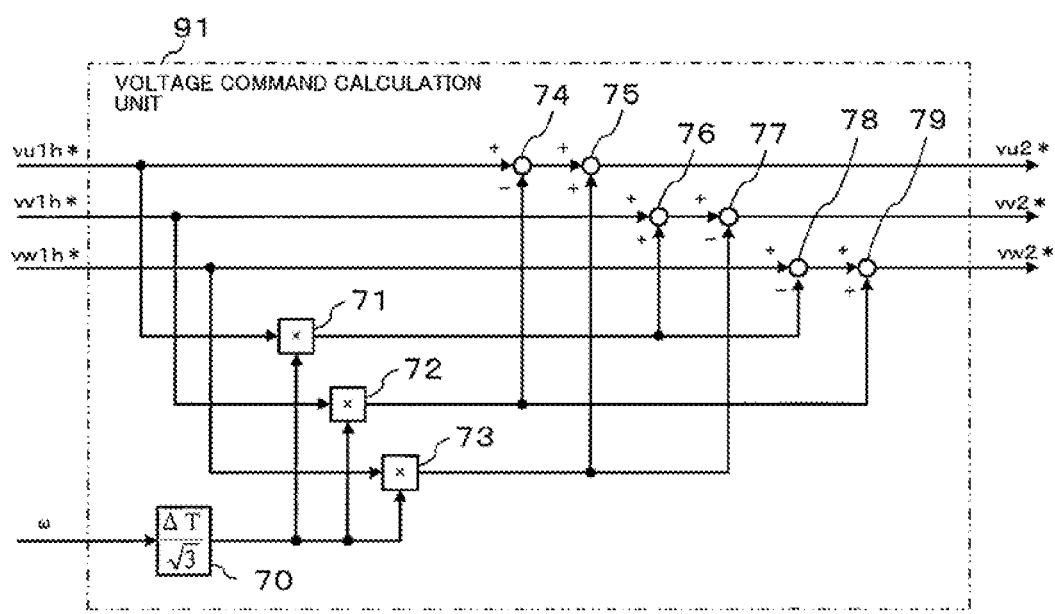
FIG. 5 is a block diagram for illustrating a configuration example of the voltage command calculation unit included in the voltage command generation unit mounted in the control device for an AC rotating machine according to the first embodiment of the present invention.

FIG. 5 is a block diagram for illustrating a configuration example of the voltage command calculation unit 91 included in the voltage command generation unit 9 mounted in the control device for an AC rotating machine according to the first embodiment of the present invention. As illustrated in FIG. 5, the voltage command calculation unit 91 includes a proportional gain multiplier 70, multipliers 71, 72, and 73, subtractors 74, 77, and 78, and adders 75, 76, and 79.

In FIG. 5, the proportional gain multiplier 70 is configured to multiply the angular frequency ω output from the angular frequency calculation unit 60 by, for example, $(\Delta T/(3)^{1/2})$, which is a fixed value predetermined as a proportional gain, to thereby output a result $(\omega\Delta T/(3)^{1/2})$ of this multiplication. The multiplier 71 is configured to multiply the U-phase memory voltage command value vu1h* on the stationary coordinates by the multiplication result $(\omega\Delta T/(3)^{1/2})$ output by the proportional gain multiplier 70, to thereby output a result $\{(\omega\Delta T/(3)^{1/2})vu1h*\}$ of the multiplication. The multiplier 72 is configured to multiply the V-phase memory voltage command value vv1h* on the stationary coordinates by the multiplication result $(\omega\Delta T/(3)^{1/2})$ output by the proportional gain multiplier 70, to thereby output a result $\{(\omega\Delta T/(3)^{1/2})vv1h*\}$ of the multiplication. The multiplier 73 is configured to multiply the W-phase memory voltage command value vw1h* on the stationary coordinates by the multiplication result $(\omega\Delta T/(3)^{1/2})$ output by the proportional gain multiplier 70, to thereby output a result $\{(\omega\Delta T/(3)^{1/2})vw1h*\}$ of the multiplication.

The subtractor 74 is configured to subtract the multiplication result $\{(\omega\Delta T/(3)^{1/2})vv1h*\}$ output by the multiplier 72 from the U-phase memory voltage command value vu1h* on the stationary coordinates, to thereby output the subtraction result $\{vu1h*-(\omega\Delta T/(3)^{1/2})vv1h*\}$. The adder 75 is configured to add the multiplication result $\{(\omega\Delta T/(3)^{1/2})vw1h*\}$ output by the multiplier 73 to the subtraction result $\{vu1h*-(\omega\Delta T/(3)^{1/2})vv1h*\}$ output by the subtractor 74, to thereby output a result of the addition $[\{vu1h*-(\omega\Delta T/(3)^{1/2})vv1h*\}+\{(\omega\Delta T/(3)^{1/2})vw1h*\}]$.

When it is assumed that the memory voltage command values vu1h*, vv1h*, and vw1h* in the U, V, and W phases on the stationary coordinates are in the state x(n) given by Expression (6), the output $[\{vu1h*-(\omega\Delta T/(3)^{1/2})vv1h*\}+\{(\omega\Delta T/(3)^{1/2})vw1h*\}]$ of the adder 75 has content corresponding to the first row on the right side of Expression (6), and becomes the second U-phase voltage command value vu2* on the stationary coordinates.

Similarly, the adder 76 is configured to add the multiplication result $\{(\omega\Delta T/(3)^{1/2})vu1h*\}$ output by the multiplier 71 to the V-phase memory voltage command value vv1h* on the stationary coordinates, to thereby output the addition result $\{vv1h*+(\omega\Delta T/(3)^{1/2})vu1h*\}$. The subtractor 77 is configured to subtract the multiplication result $\{(w\Delta T/(3)^{1/2})vw1h*\}$ output by the multiplier 73 from the addition result $\{vv1h*+(\omega\Delta T/(3)^{1/2})vu1h*\}$ output by the adder 76, to thereby output a result of the subtraction $[\{vv1h*+(\omega\Delta T/(3)^{1/2})vu1h*\}-\{(\omega\Delta T/(3)^{1/2})vw1h*\}]$.

When it is assumed that the memory voltage command values vu1h*, vv1h*, and vw1h* in the U, V, and W phases on the stationary coordinates are in the state x(n) given by Expression (6), the output $[\{vv1h*+(\omega\Delta T/(3)^{1/2})vu1h*\}-\{(\omega\Delta T/(3)^{1/2})vw1h*\}]$ of the subtractor 77 has content corresponding to the second row on the right side of Expression (6), that is, the second V-phase voltage command value vv2* on the stationary coordinates.

Similarly, the subtractor 78 is configured to subtract the multiplication result $\{(\omega\Delta T/(3)^{1/2})vu1h*\}$ output by the multiplier 71 from the W-phase memory voltage command value vw1h* on the stationary coordinates, to thereby output the subtraction result $\{vw1h*-(\omega\Delta T/(3)^{1/2})vu1h*\}$. The adder 79 is configured to add the multiplication result $\{(\omega\Delta T/(3)^{1/2})vv1h*\}$ output by the multiplier 72 to the subtraction result $\{vw1h*-(\omega\Delta T/(3)^{1/2})vu1h*\}$ output by the subtractor 78, to thereby output a result of the addition $[\{vw1h*-(\omega\Delta T/(3)^{1/2})vu1h*\}+\{(\omega\Delta T/(3)^{1/2})vv1h*\}]$.

A second three-phase voltage command value in any one phase of the second three-phase voltage command values vu2*, vv2*, and vw2* on the stationary coordinates may be calculated from those values in remaining two phases based on a relationship that a sum of the second three-phase voltage command values vu2*, vv2*, and vw2* on the stationary coordinates is zero.

When it is assumed that the memory voltage command values vu1h*, vv1h*, and vw1h* in the U, V, and W phases on the stationary coordinates are in the state x(n) given by Expression (6), the output $[\{vw1h*-(\omega\Delta T/(3)^{1/2})vu1h*\}+\{(\omega\Delta T/(3)^{1/2})vv1h*\}]$ of the adder 79 has content corresponding to the third row on the right side of Expression (6), that is, the second W-phase voltage command value vw2* on the stationary coordinates.

When the voltage command output unit 10 selects the first three-phase voltage command values vu1*, vv1*, and vw1* as the three-phase voltage command values vu*, vv*, and vw* on the stationary coordinates, the calculation result of the voltage command calculation unit 91 is not reflected to any units. Therefore, when the voltage command output unit 10 selects the first three-phase voltage command values vu1*, vv1*, and vw1*, the execution of the calculation in the voltage command calculation unit 91 can be omitted.

Similarly, when the voltage command output unit 10 selects the second three-phase voltage command values vu2*, vv2*, and vw2* as the three-phase voltage command values vu*, vv*, and vw* on the stationary coordinates, the respective calculation results of the current detection unit 4, the first coordinate conversion unit 6, the current control unit 7, and the second coordinate conversion unit 8 are not reflected to any units. Therefore, the execution of the calculations in the current detection unit 4, the first coordinate conversion unit 6, the current control unit 7, and the second coordinate conversion unit 8 can be omitted.

FIG. 6 is an example of a time chart for showing operation examples of the respective units in the control device for an AC rotating machine according to the first embodiment of the present invention. This time chart is a time chart in a case in which the second operation cycle ΔT2 is set to ½ time the first operation cycle ΔT1. In this case, it is assumed that the first operation cycle ΔT1 and the second operation cycle ΔT2 are generated from the reference operation cycle ΔT serving as a reference timing of the operation, and the second operation cycle ΔT2 is set to the reference operation cycle ΔT. On the basis of this assumption, the second operation timing arrives twice while the first operation timing arrives each time the first operation cycle ΔT1 elapses. One of the two times of the second operation timings arrives at the same timing as the first operation timing.

In FIG. 6, time points (seconds) having the reference operation cycle ΔT as a unit are shown as 0, ΔT, 2ΔT, . . . , 7ΔT on a row (a). On a row (b) to a row (j), operation states at each time point of the position detection unit 3, the current detection unit 4, the first coordinate conversion unit 6, the current control unit 7, the second coordinate conversion unit 8, the angular frequency calculation unit 60, the storage unit 90, the voltage command calculation unit 91, and the voltage command output unit 10 as the respective units forming the control device for an AC rotating machine are shown, respectively.

A notation "execute" on the row (b) to the row (g), and the row (i) indicates execution of processing by each of the position detection unit 3, the current detection unit 4, the first coordinate conversion unit 6, the current control unit 7, the second coordinate conversion unit 8, the angular frequency calculation unit 60, and the voltage command calculation unit 91. A blank field indicates that the processing is not executed. A notation "store" and a notation "hold" on the row (h) for the storage unit 90 indicate the storage of the first three-phase voltage command values vu1*, vv1*, and vw1* and the holding and the output of the stored first three-phase voltage command values vu1*, vv1*, and vw1* executed by the storage unit 90, respectively. A notation "first voltage command values" and a notation of "second voltage command values" on the row (j) for the voltage command output unit 10 indicate the selection and output of the first three-phase voltage command values vu1*, vv1*, and vw1* and the selection and output of the second three-phase voltage command values vu2*, vv2*, and vw2* executed by the voltage command output unit 10, respectively.

As described above, the position detection unit 3, the current detection unit 4, the first coordinate conversion unit 6, the current control unit 7, and the second coordinate conversion unit 8 are the components relating to only the generation of the first three-phase voltage command values vu1*, vv1*, and vw1*. The angular frequency calculation unit 60, the storage unit 90, and the voltage command calculation unit 91 are the components relating to only the generation of the second three-phase voltage command values vu2*, vv2*, and vw2*. However, the storage unit 90 is required to store the first three-phase voltage command values vu1*, vv1*, and vw1* in order to generate the second three-phase voltage command values vu2*, vv2*, and vw2*. Moreover, the angular frequency calculation unit 60 is required to execute the processing each time the first operation cycle ΔT1 elapses in order to generate the second three-phase voltage command values vu2*, vv2*, and vw2*.

In consideration of this configuration, in the first embodiment, as shown in FIG. 6, when the first operation timing arrives, the position detection unit 3, the current detection unit 4, the first coordinate conversion unit 6, the current control unit 7, the second coordinate conversion unit 8, and the angular frequency calculation unit 60 are each caused to execute the processing, and the storage unit 90 is caused to store the first three-phase voltage command values vu1*, vv1*, and vw1*. The voltage command output unit 10 is caused to select the first three-phase voltage command values vu1*, vv1*, and vw1*. The voltage command calculation unit 91 is caused not to execute the processing. Meanwhile, as shown in FIG. 6, when only the second operation timing arrives, the voltage command calculation unit 91 is caused to execute the processing of using the first three-phase voltage command values vu1*, vv1*, and vw1* held by the storage unit 90, and the voltage command output unit 10 is caused to select the second three-phase voltage command values vu2*, vv2*, and vw2*. None of the position detection unit 3, the current detection unit 4, the first coordinate conversion unit 6, the current control unit 7, the second coordinate conversion unit 8, and the angular frequency calculation unit 60 is caused to execute processing. In FIG. 6, a time point 8ΔT and later time points are omitted. The operations from the time point 0 to the time point 7ΔT are repeated after the time point 8ΔT.

In this manner, in the first embodiment, the processing content is divided into the processing content executed by a first group including the position detection unit 3, the current detection unit 4, the first coordinate conversion unit 6, the current control unit 7, the second coordinate conversion unit 8, and the angular frequency calculation unit 60, and the processing content executed by a second group including the voltage command calculation unit 91. Those two groups are caused to selectively execute the processing at the arrival of at least one of the first operation timing and the second operation timing. As a result, in the example shown in FIG. 6, the three-phase voltage command values vu*, vv*, and vw* on the stationary coordinates output from the voltage command output unit 10 are updated at the intervals of the second operation cycles ΔT2.

When the three-phase voltage command values vu*, vv*, and vw* on the stationary coordinates are updated at the intervals of the first operation cycles ΔT1, current pulsation occurs at the intervals of the first update cycles ΔT1, and noise thus occurs at (1/ΔT1) Hz. Meanwhile, when the three-phase voltage command values vu*, vv*, and vw* on the stationary coordinates are updated at the intervals of the second operation cycles ΔT2, current pulsation occurs at the second update cycles ΔT2, and the frequency of the noise is thus (1/ΔT2) Hz. A relationship of ΔT1>ΔT2 is satisfied, and a relationship of (1/ΔT1)<(1ΔT2) is thus satisfied. Thus, components of noise/vibration caused by the noise can be shifted to a higher frequency by adding the processing by the second group. As the frequency of sound increases, the sound is less likely to be heard by the human ears, and the sense of discomfort given to the human by the noise is thus reduced.

The calculation for generating the second three-phase voltage command values vu2*, vv2*, and vw2* is executed by the angular frequency calculation unit 60 and the voltage command calculation unit 91. The calculation for obtaining the angular frequency ω executed by the angular frequency calculation unit 60 includes the one subtraction by the subtractor 62 and the one multiplication by the proportional gain multiplier 63. The calculation for obtaining the second three-phase voltage command values vu2*, vv2*, and vw2* executed by the voltage command calculation unit 91 includes a total of four multiplications by the proportional gain multiplier 70 and the multipliers 71, 72, and 73 and a total of six additions and subtractions by the subtractors 74, 77, and 78 and the adders 75, 76, and 79. The total calculation amount of those calculations is much smaller than a total calculation amount in the position detection unit 3, the current detection unit 4, the first coordinate conversion unit 6, the current control unit 7, and the second coordinate conversion unit 8. Thus, the sense of discomfort given to the human by the noise can be reduced while the calculation amount per unit time is suppressed.

As described above, the first coordinate conversion unit 6, the current control unit 7, the second coordinate conversion unit 8, the voltage command generation unit 9, the angular frequency calculation unit 60, and the voltage command output unit 10 are each implemented by the digital circuit, which is, for example, a microcomputer. A required performance level of the microcomputer is reduced by suppressing the calculation amount per unit time. Therefore, a manufacturing cost of the control device for an AC rotating machine can be further suppressed by suppressing the calculation amount per unit time.

In the example illustrated in FIG. 6, the voltage command output unit 10 selects the second three-phase voltage command values vu2*, vv2*, and vw2* as the three-phase voltage command values vu*, vv*, and vw* on the stationary coordinates at a center between the first operation timings next to each other. However, the timing for selecting the second three-phase voltage command values vu2*, vv2*, and vw2* between the first operation timings next to each other is not required to be the center. That is, for example, the second three-phase voltage command values vu2*, vv2*, and vw2* may be selected when, for example, $\Delta T1/10$, $2\Delta T\frac{1}{5}$, or $3\Delta T\frac{1}{5}$ elapses after the arrival of the first operation timing. The number of selections of the second three-phase voltage command values vu2*, vv2*, and vw2* may be two or more. As described above, the timing for selecting the second three-phase voltage command values vu2*, vv2*, and vw2* between the first operation timings next to each other and the number of those timings are not particularly limited.

Figure 7:
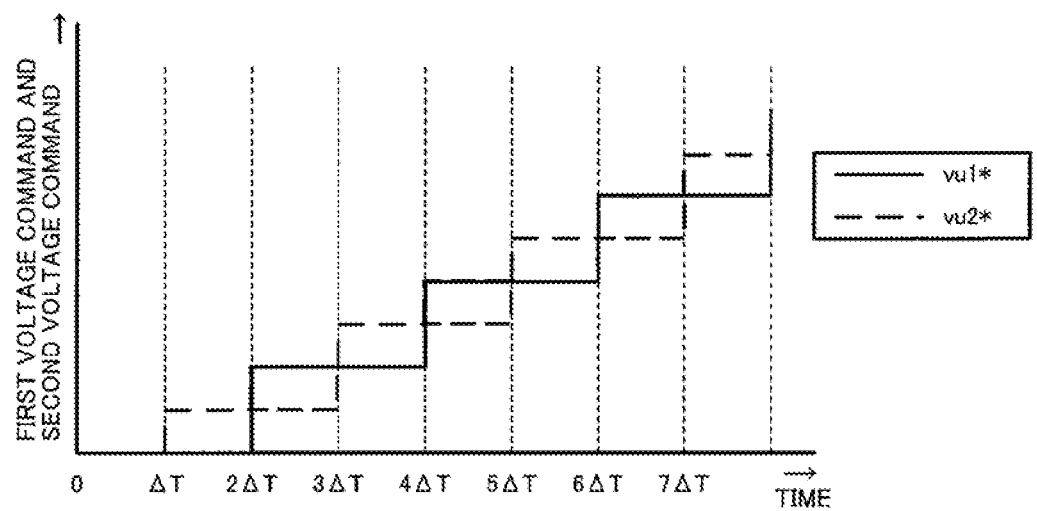
FIG. 7 is a graph for showing an example of a first U-phase voltage command value vu1* on stationary coordinates and a second U-phase voltage command value vu2* on the stationary coordinates, which are generated when the control device for an AC rotating machine according to the first embodiment of the present invention is operated in accordance with the time chart of FIG. 6.

FIG. 7 is a graph for showing an example of the first U-phase voltage command value vu1* on the stationary coordinates and the second U-phase voltage command value vu2* on the stationary coordinates generated when the control device for an AC rotating machine according to the first embodiment of the present invention is operated in accordance with the time chart of FIG. 6. In the example of FIG. 7, a section in which the first U-phase voltage command value vu1* on the stationary coordinates monotonically increases is shown in an extracted form.

The first U-phase voltage command value vu1* on the stationary coordinates is updated each time the first operation timing arrives. As a result, as shown in FIG. 7, the first U-phase voltage command value vu1* on the stationary coordinates is updated at the time points 0, $2\Delta T$, $4\Delta T$, $6\Delta T$, . . . . Meanwhile, the second U-phase voltage command value vu2* on the stationary coordinates is updated each time only the second operation timing arrives. As a result, as shown in FIG. 7, the second U-phase voltage command value vu2* on the stationary coordinates is updated at the time points $\Delta T$, $3\Delta T$, $5\Delta T$, $7\Delta T$, . . . . The second U-phase voltage command value vu2* is not updated at the time points 0, $2\Delta T$, $4\Delta T$, $6\Delta T$, . . . , and is thus not changed until the next update. The second U-phase voltage command value vu2* is obtained by correcting the phase of the U-phase memory voltage command value vu1 h*, and is thus different from this U-phase memory voltage command value vu1 h*. More specifically, in FIG. 7, the second U-phase voltage command value vu2* has a larger value than that of the U-phase memory voltage command value vu1h*.

The voltage command output unit 10 selects the first U-phase voltage command value vu1* at the time points 0, $2\Delta T$, $4\Delta T$, $6\Delta T$, . . . , and selects the second U-phase voltage command value vu2* at the time points $\Delta T$, $3\Delta T$, $5\Delta T$, $7\Delta T$, . . . . Consequently, the U-phase voltage command value vu* on the stationary coordinates output from the voltage command output unit 10 is the voltage command value updated each time the second operation timing arrives, that is, at the time points 0, $\Delta T$, $2\Delta T$, $3\Delta T$, $4\Delta T$, $5\Delta T$, $6\Delta T$, . . . . As a result, the U-phase voltage command value vu* on the stationary coordinates is updated at the shorter cycles, that is, at the higher frequency, and is input to the voltage application unit 1 as a smoother signal compared with a case of the update at the first operation timing.

In FIG. 7, only the first U-phase voltage command value vu1* and the second U-phase voltage command value vu2* are shown, but the other first V-phase voltage command value vv1* and first W-phase voltage command value vw1* have the same relationships with the second V-phase voltage command value vv2* and the second W-phase voltage command value vw2*. Therefore, the V-phase voltage command value vv* and the W-phase voltage command value vw* on the stationary coordinates are also updated at the shorter cycles, that is, at the higher frequency, and are input to the voltage application unit 1 as smoother signals compared with the case of the update at the first operation timing.

In the first embodiment, as described above, the phases of the first three-phase voltage command values vu1*, vv1*, and vw1* are corrected, to thereby generate the second three-phase voltage command values vu2*, vv2*, and vw2*. This is for a reason described below.

Relationships between the d-axis current Id, the q-axis current Iq, a d-axis voltage Vd, and a q-axis voltage Vq are given by Expression (7) through use of a resistance Ra, a d-axis inductance Ld, a q-axis inductance Lq, and a magnetic flux $$\begin{cases} Vd = RaId - \omega LqIq \\ Vq = RaIq + \omega LdId + \omega \phi \end{cases} \quad (7)$$

In a region in which the angular frequency $\omega$ is very low, the d-axis voltage Vd is substantially proportional to the d-axis current Id, and the q-axis voltage Vq is substantially proportional to the q-axis current Iq. The phases of the three-phase currents and the phases of the three-phase voltages substantially match each other on the stationary coordinates. There exists a related art of adding a product of a change amount of the detection current and a proportional gain to the first voltage command value on the stationary coordinates, to thereby generate the second voltage command value based on this relationship (for example, see Patent Literature 1). Description is now given in a form of comparison with this related art.

As the angular frequency $\omega$ becomes higher, influence of armature reaction and an induced voltage becomes larger, and the differences in phase between the currents and the voltages become larger. For the convenience of description, when it is assumed that the d-axis current is zero, the voltage equation is given by Expression (8) below.

$$\begin{cases} Vd = -\omega LqIq \\ Vq = RaIq + \omega \phi \end{cases} \quad (8)$$

Figure 8:
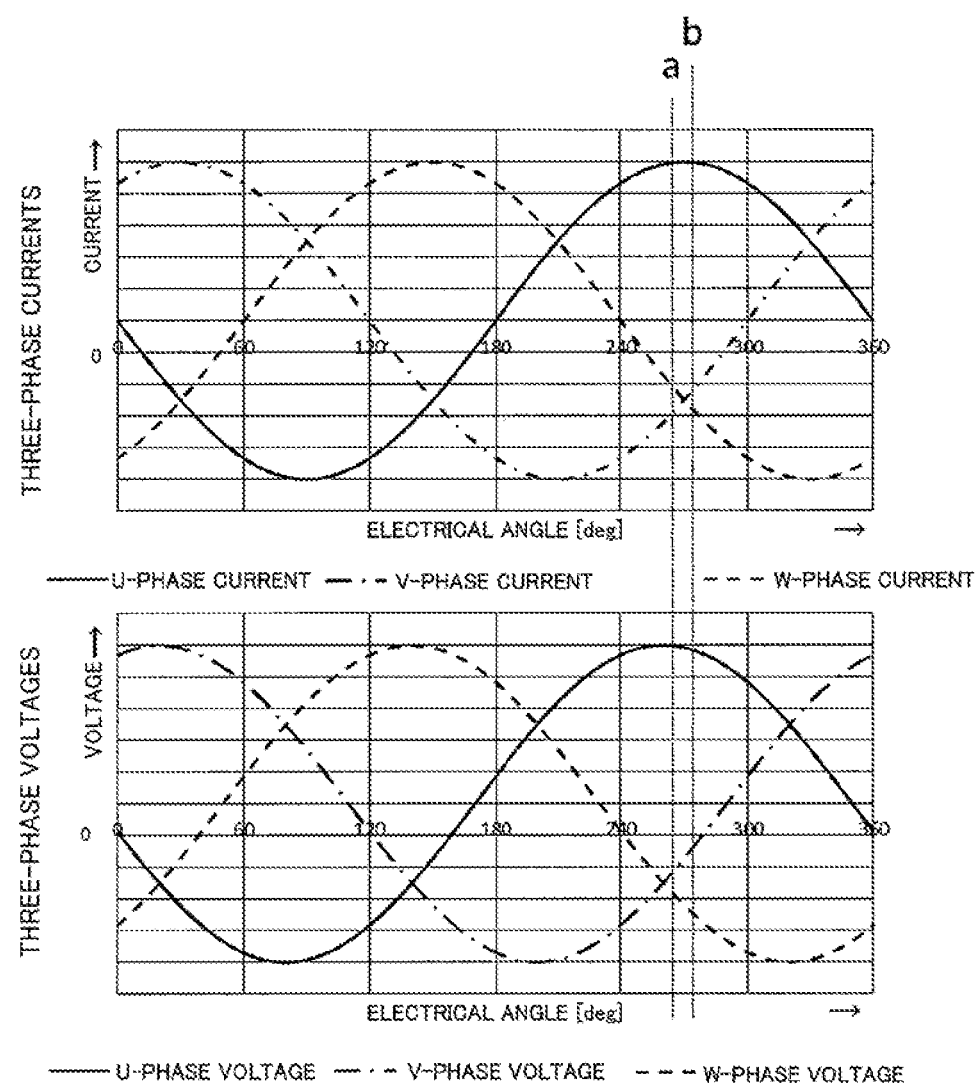
FIG. 8 is a graph for showing an example of waveforms of three-phase currents and three-phase voltages different in phase from each other by 10 degrees in a steady state.

While the phase of the current is in the q-axis direction, the phase of the voltage is in a direction advanced with respect to the q-axis direction. As an example, waveforms of the three-phase currents and the three-phase voltages different in phase by 10 degrees in the steady state are shown in FIG. 8. In FIG. 8, the top graph indicates the three-phase currents on the stationary coordinates, and the bottom graph indicates the three-phase voltages on the stationary coordinates. In FIG. 8, it is shown that, for example, when the voltage command values on the bottom graph are given, the currents on the top graph are obtained under this steady state in which this angular frequency does not change.

When the detection currents are fed back so as to generate the voltage command values, differences actually occur in accordance with a time constant of the control response. That is, expected voltage command values and voltage command values actually generated do not match each other, and the differences thus occur therebetween. However, for the convenience of the description, the occurrence of the differences is neglected in this description.

In FIG. 8, it is assumed that the first voltage command values on the stationary coordinates are generated at a timing "a", and the second voltage command values on the stationary coordinates are generated at a timing "b". In this case, when expected voltage command values are given at the timing "a", the U-phase current increases, the V-phase current increases, and the W-phase current decreases during the transition to the timing "b". The second voltage command value on the stationary coordinates at the timing "b" can be obtained by adding the result of multiplication of the change amount of the detection current on the stationary coordinates by the proportional gain to the first voltage command value on the stationary coordinates at the timing "a".

The change amounts of the detection current on the stationary coordinates are positive in the U phase, positive in the V phase, and negative in the W phase in the transition from the timing "a" to the timing "b". Therefore, the voltage command values on the stationary coordinates at the timing "b" are increased in the U phase, increased in the V phase, and decreased in the W phase with respect to the voltage command values at the timing "a". However, as shown on the bottom graph of FIG. 8, voltage command values required to be obtained on the stationary coordinates at the timing "b" are decreased in the U phase, increased in the V phase, and decreased in the W phase with respect to the voltage command values at the timing "a". Therefore, in the related art, unnecessary current fluctuation is caused in a high rotation region having the large difference in phase between the currents and the voltages. In order to suppress the unnecessary current fluctuation even in the high rotation region, a mechanism for suppressing the fluctuation is required, and a calculation amount actually required thus increases. The unnecessary current fluctuation causes the occurrence of the noise in the AC rotating machine 2.

Meanwhile, in the first embodiment, the second three-phase voltage command values are generated without using the detection currents. Therefore, the phase differences changing in accordance with the angular frequency between the currents and the voltages are not required to be considered. Moreover, the first three-phase voltage command values are values basically changing cyclically. In consideration of this fact, as described above, the second three-phase voltage command values can appropriately be generated with the relatively small calculation amount at the timing different from the timing at which the first three-phase voltage command values are generated. Therefore, the appropriate second three-phase voltage command values can be generated while the calculation amount per unit time is suppressed compared with the above-mentioned related art.

The first embodiment may be combined with the above-mentioned related art or other related art in accordance with a situation. For example, in FIG. 6, when the detection currents are used to generate the second three-phase voltage command values at the timings of the time points 2ΔT, 6ΔT, . . . , feedback based on the detection currents is to be executed at each 2ΔT. As a result, the sense of discomfort caused by the noise can be reduced while the increase in calculation amount is suppressed in addition to the suppression of a decrease in responsiveness.

Second Embodiment

In a second embodiment of the present invention, the mechanism for generating the second three-phase voltage command values vu2*, vv2*, and vw2* is different from that in the above-mentioned first embodiment. Description is now given while focusing on only this mechanism. The same reference symbols are used for the same or substantially the same components as those in the above-mentioned first embodiment.

Figure 9:
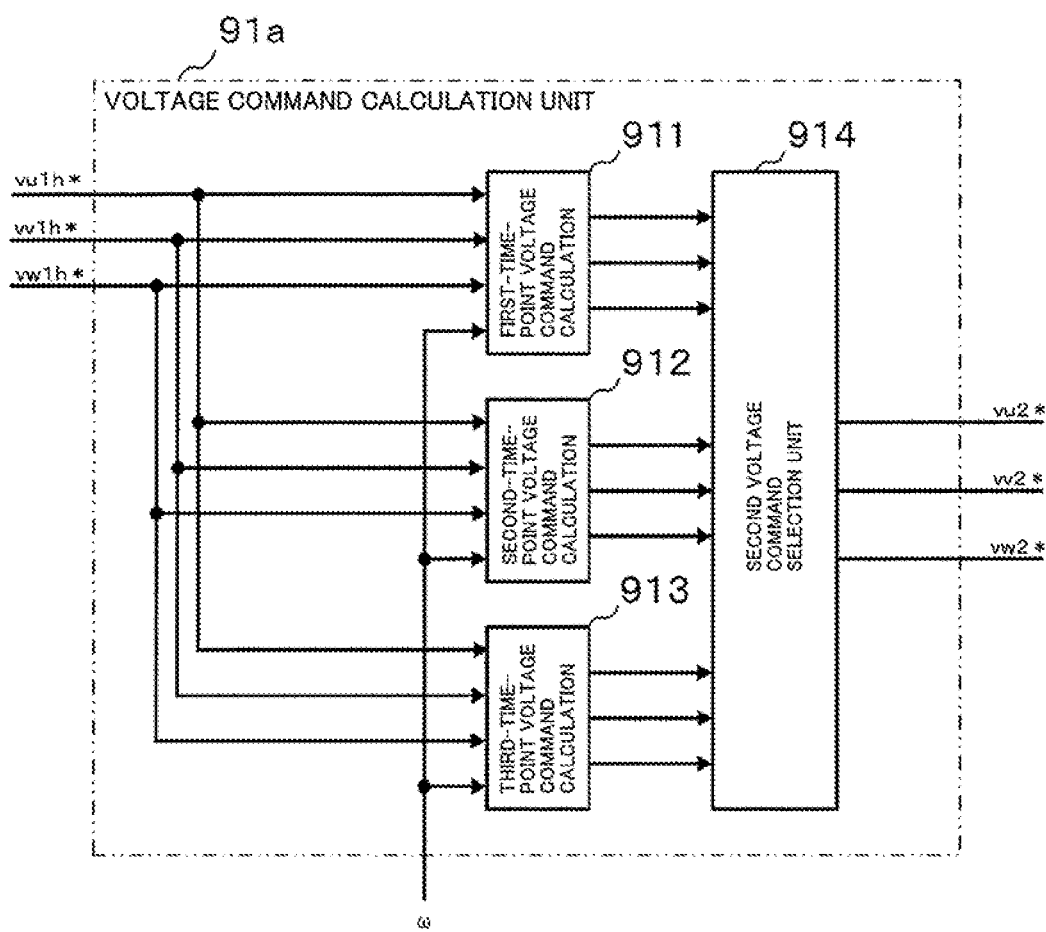
FIG. 9 is a block diagram for illustrating a configuration example of a voltage command calculation unit employed in a second embodiment of the present invention.

FIG. 9 is a block diagram for illustrating a configuration example of a voltage command calculation unit 91a in the second embodiment. First, referring to FIG. 9, a specific description is given of the voltage command calculation unit 91a in the second embodiment.

As illustrated in FIG. 9, the voltage command calculation unit 91a in the second embodiment includes a first-time-point voltage command calculation unit 911, a second-time-point voltage command calculation unit 912, a third-time-point voltage command calculation unit 913, and a second voltage command selection unit 914. The voltage command calculation unit 91a is also implemented on, for example, a microcomputer, as in the voltage command calculation unit 91 in the above-mentioned first embodiment.

The three-phase memory voltage command values vu1h*, vv1h*, and vw1h* from the storage unit 90 and the angular frequency ω from the angular frequency calculation unit 60 are input to each of the first-time-point voltage command calculation unit 911, the second-time-point voltage command calculation unit 912, and the third-time-point voltage command calculation unit 913. The first-time-point voltage command calculation unit 911, the second-time-point voltage command calculation unit 912, and the third-time-point voltage command calculation unit 913 are configured to correct the phases of the three-phase memory voltage command values vu1h*, vv1h*, and vw1h* based on the angular frequency ω, to thereby generate first-time-point voltage command values vu21*, vv21*, and vw21*, second-time-point voltage command values vu22*, vv22*, and vw22*, and third-time-point voltage command values vu23*, vv23*, and vw23*, respectively, as in the above-mentioned first embodiment. All of those generated second voltage command values correspond to third voltage command values on the stationary coordinates, and are output to the second voltage command selection unit 914.

Description is now given of the first time point, the second time point, and the third time point. The voltage command calculation unit 91a operates when the second operation timing arrives as in the above-mentioned first embodiment. In the second embodiment, the second operation cycle ΔT2 is set to a cycle of ¼ time the first operation cycle ΔT1. As a result, three second operation timings exist between the two first operation timings next to each other.

The three second operation timings existing between the two first operation timings next to each other equally divide the period between those two first operation timings next to each other, namely, the first operation cycle ΔT1, into four periods, by setting the second operation cycle ΔT2 to the cycle of ¼ time the first operation cycle ΔT1. As a result, the first time point is a time point after the second operation cycle ΔT2 elapses from the first operation timing existing before. Similarly, the second time point is a time point after 2ΔT2, which is twice the second operation cycle ΔT2, elapses from the first operation timing existing before. The third time point is a time point after $3\Delta T2$, which is three times the second operation cycle $\Delta T2$, elapses from the first operation timing existing before. All of the first time point, the second time point, and the third time point are the second operation timings.

Only the first-time-point voltage command calculation unit 911 operates at the first time point, and the first-time-point voltage command values vu21*, vv21*, and vw21* are generated, and are then output. The first-time-point voltage command values vu21*, vv21, and vw21* are digital signals, and include a first-time-point U-phase voltage command value vu21*, a first-time-point V-phase voltage command value vv21*, and a first-time-point W-phase voltage command value vw21*.

Only the second-time-point voltage command calculation unit 912 operates at the second time point, and the second-time-point voltage command values vu22*, vv22*, and vw22* are generated, and are then output. The second-time-point voltage command values vu22*, vv22*, and vw22* are also digital signals, and include a second-time-point U-phase voltage command value vu22*, a second-time-point V-phase voltage command value vv22*, and a second-time-point W-phase voltage command value vw22*.

Only the third-time-point voltage command calculation unit 913 operates at the third time point, and the third-time-point voltage command values vu23*, vv23*, and vw23* are generated, and are then output. The third-time-point voltage command values vu23*, vv23*, and vw23* are also digital signals, and include a third-time-point U-phase voltage command value vu23*, a third-time-point V-phase voltage command value vv23*, and a third-time-point W-phase voltage command value vw23*.

The angular frequency calculation unit 60 configured to output the angular frequency $\omega$ operates when the first operation timing arrives as in the above-mentioned first embodiment. As a result, the angular frequency $\omega$ has the same value at the first time point, the second time point, and the third time point.

The first-time-point voltage command calculation unit 911, the second-time-point voltage command calculation unit 912, and the third-time-point voltage command calculation unit 913 are configured to execute the calculation as given by Expression (6). Therefore, the configuration of each of the first-time-point voltage command calculation unit 911, the second-time-point voltage command calculation unit 912, and the third-time-point voltage command calculation unit 913 is basically the same as that of the voltage command calculation unit 91 in the above-mentioned first embodiment. Therefore, a detailed description thereof is omitted. However, the first to third time points are the second operation timings different from one another, and thus proportional gains to be used for the calculation are different from one another. That is, the very short period $\Delta T$ in Expression (6) is the second operation cycle $\Delta T2$ at the first time point, is twice the second operation cycle $\Delta T2$ at the second time point, and is three times the second operation cycle $\Delta T2$ at the third time point.

The approximation given by Expression (4) is also used in the second embodiment as in the above-mentioned first embodiment, but Expression (5), which is the calculation expression for the phase correction, may be used in place of Expression (4) for the approximation. Further, the approximation given by Expression (2) may be replaced by, for example, the approximation of "$\cos(\omega\Delta T) \approx 1-(\omega\Delta T)^2 \div 2$" based on the Maclaurin's expansion, to thereby derive an expression for the phase correction.

The second voltage command selection unit 914 is configured to select the first-time-point voltage command values vu21*, vv21*, and vw21* at the first time point, to output the selected first-time-point voltage command values vu21*, vv21*, and vw21* as the second three-phase voltage command values vu2*, vv2*, and vw2*. Similarly, the second voltage command selection unit 914 is configured to select the second-time-point voltage command values vu22*, vv22*, and vw22* at the second time point, to output the selected second-time-point voltage command values vu22*, vv22*, and vw22* as the second three-phase voltage command values vu2*, vv2*, and vw2*. Similarly, the second voltage command selection unit 914 is configured to select the third-time-point voltage command values vu23*, vv23*, and vw23* at the third time point, to output the selected third-time-point voltage command values vu23*, vv23*, and vw23* as the second three-phase voltage command values vu2*, vv2*, and vw2*.

FIG. 10 is an example of a time chart for showing operation examples of the respective units in the control device for an AC rotating machine according to the second embodiment of the present invention. As described above, this time chart is a time chart in a case in which the second operation cycle $\Delta T2$ is set to ¼ time the first operation cycle $\Delta T1$. In this case, it is assumed that the first operation cycle $\Delta T1$ and the second operation cycle $\Delta T2$ are generated from the reference operation cycle $\Delta T$ serving as a reference timing of the operation, and the second operation cycle $\Delta T2$ is set to the reference operation cycle $\Delta T$. On the basis of this assumption, the second operation timing arrives four times while the first operation timing arrives each time the first operation cycle $\Delta T1$ elapses. One of the four times of the second operation timings arrives at the same timing as the first operation timing.

In FIG. 10, time points (seconds) having the reference operation cycle $\Delta T$ as a unit are shown as 0, $\Delta T$, $2\Delta T$, . . . , $9\Delta T$ on a row (a). On a row (b) to a row (m), operation states at each time point of the position detection unit 3, the current detection unit 4, the first coordinate conversion unit 6, the current control unit 7, the second coordinate conversion unit 8, the angular frequency calculation unit 60, the storage unit 90, the first-time-point voltage command calculation unit 911, the second-time-point voltage command calculation unit 912, the third-time-point voltage command calculation unit 913, the second voltage command selection unit 914, and the voltage command output unit 10 as the respective units forming the control device for an AC rotating machine are shown, respectively.

A notation "execute" on the row (b) to the row (g), and the row (i) to the row (k) indicates execution of processing by each of the position detection unit 3, the current detection unit 4, the first coordinate conversion unit 6, the current control unit 7, the second coordinate conversion unit 8, the angular frequency calculation unit 60, the first-time-point voltage command calculation unit 911, the second-time-point voltage command calculation unit 912, and the third-time-point voltage command calculation unit 913. A blank field indicates that the processing is not executed. A notation "store" and a notation "hold" on the row (h) for the storage unit 90 indicate the storage of the first three-phase voltage command values vu1*, vv1*, and vw1* and the holding and the output of the stored first three-phase voltage command values vu1*, vv1*, and vw1* executed by the storage unit 90, respectively. Notations "first-time-point voltage command values," "second-time-point voltage command values," and "third-time-point voltage command values" on the row (l) for the second voltage command selection unit 914 indicate the selection of the first-time-point voltage command values vu21*, vv21*, and vw21*, the second-time-point voltage command values vu22*, vv22*, and vw22*, and the third-time-point voltage command values vu23*, vv23*, and vw23* executed by the second voltage command selection unit 914, respectively. A notation "first voltage command values" and a notation of "second voltage command values" on the row (m) for the voltage command output unit 10 indicate the selection and output of the first three-phase voltage command values vu1*, vv1*, and vw1* and the selection and output of the second three-phase voltage command values vu2*, vv2*, and vw2* executed by the voltage command output unit 10, respectively.

Also in the second embodiment, as shown in FIG. 10, the position detection unit 3, the current detection unit 4, the first coordinate conversion unit 6, the current control unit 7, the second coordinate conversion unit 8, and the angular frequency calculation unit 60 are each caused to execute the processing, and the storage unit 90 is caused to store the first three-phase voltage command values vu1*, vv1*, and vw1* when the first operation timing arrives. The voltage command output unit 10 is caused to select the first three-phase voltage command values vu1*, vv1*, and vw1*. The first-time-point voltage command calculation unit 911, the second-time-point voltage command calculation unit 912, and the third-time-point voltage command calculation unit 913 are caused not to execute the processing.

Meanwhile, when only the second operation timing arrives, as shown in FIG. 10, the first-time-point voltage command calculation unit 911, the second-time-point voltage command calculation unit 912, and the third-time-point voltage command calculation unit 913 are caused to sequentially execute the processing of using the first three-phase voltage command values vu1*, vv1*, and vw1* held by the storage unit 90. None of the position detection unit 3, the current detection unit 4, the first coordinate conversion unit 6, the current control unit 7, the second coordinate conversion unit 8, and the angular frequency calculation unit 60 is caused to execute processing. As a result, in the second embodiment, the calculation amount required in order to generate the second three-phase voltage command values vu2*, vv2*, and vw2* selected by the voltage command output unit 10 is further suppressed. In FIG. 10, a time point 10ΔT and later time points are omitted. The operations from the time point 2ΔT to the time point 9ΔT are repeated after the time point 10ΔT.

When the three-phase voltage command values vu*, vv*, and vw* on the stationary coordinates are updated at the same time intervals as those in the above-mentioned first embodiment, the first operation cycle ΔT1 in the second embodiment can be twice as long as that in the above-mentioned first embodiment. Therefore, in the second embodiment, the calculation amount per unit time can be further suppressed compared with the above-mentioned first embodiment.

Figure 11:
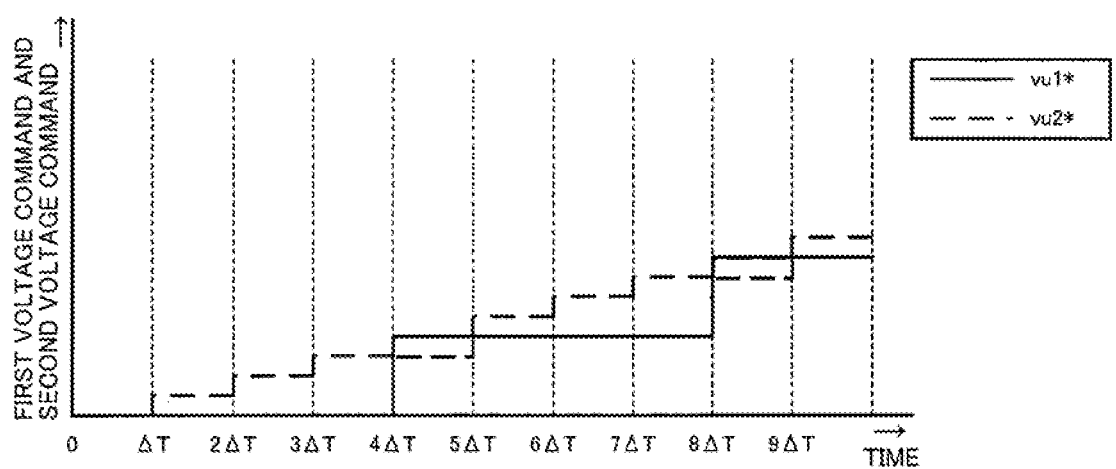
FIG. 11 is a graph for showing an example of a first U-phase voltage command value vu1* on the stationary coordinates and a second U-phase voltage command value vu2* on the stationary coordinates, which are generated when the control device for an AC rotating machine according to the second embodiment of the present invention is operated in accordance with the time chart of FIG. 10.

FIG. 11 is a graph for showing an example of the first U-phase voltage command value vu1* on the stationary coordinates and the second U-phase voltage command value vu2* on the stationary coordinates generated when the control device for an AC rotating machine according to the second embodiment of the present invention is operated in accordance with the time chart of FIG. 10. Also in the example of FIG. 11, a section in which the first U-phase voltage command value vu1' on the stationary coordinates monotonically increases is shown in an extracted form as in the above-mentioned example of FIG. 7.

The first U-phase voltage command value vu1* on the stationary coordinates is updated each time the first operation timing arrives. As a result, as shown in FIG. 11, the first U-phase voltage command value vu1* on the stationary coordinates is updated at the time points 0, 4ΔT, 8ΔT, . . . . Meanwhile, the second U-phase voltage command value vu2* on the stationary coordinates is updated each time only the second operation timing arrives. As a result, as shown in FIG. 11, the second U-phase voltage command value vu2* on the stationary coordinates is updated at the time points ΔT, 2ΔT, 3ΔT, 5ΔT, 6ΔT, 7ΔT, 9ΔT, . . . . More specifically, the second U-phase voltage command value vu2* is updated through the generation of the first-time-point voltage command value vu21* at the time points ΔT, 5ΔT, and 9ΔT, through the generation of the second-time-point voltage command value vu22* at the time points 2ΔT and 6ΔT, and through the generation of the third-time-point voltage command value vu23* at the time points 3ΔT and 7ΔT. The second U-phase voltage command value vu2* is not updated at the time points 0, 4ΔT, 8ΔT, . . . . Therefore, the second U-phase voltage command value vu2* does not change, and the third-time-point voltage command value vu23* is thus held until the next update.

The first-time-point voltage command values vu21*, vv21*, and vw21*, the second-time-point voltage command values vu22*, vv22*, and vw22*, and the third-time-point voltage command values vu23*, vv23*, and vw23* are generated through use of the proportional gains different from one another, and the value of the second U-phase voltage command value vu2* thus changes in accordance with the time point. In FIG. 11, the second U-phase voltage command value vu2* has such a magnitude relationship of "first-time-point voltage command value vu21*<second-time-point voltage command value vu22*<third-time-point voltage command value vu23*."

The voltage command output unit 10 selects the first U-phase voltage command value vu1* at the time points 0, 4ΔT, 8ΔT, . . . , and selects the second U-phase voltage command value vu2* at the time points ΔT, 2ΔT, 3ΔT, 5ΔT, 6ΔT, 7ΔT, 9ΔT, . . . . Consequently, the U-phase voltage command value vu* on the stationary coordinates output from the voltage command output unit 10 is the voltage command value updated each time the second operation timing arrives, that is, at the time points 0, ΔT, 2ΔT, 3ΔT, 4ΔT, 5ΔT, 6ΔT, 7ΔT, 8ΔT, 9ΔT . . . . As a result, the U-phase voltage command value vu* on the stationary coordinates is updated at the shorter cycles, that is, at the higher frequency, and is input to the voltage application unit 1 as a smoother signal compared with a case of the update only at the first operation timing.

In FIG. 11, only the first U-phase voltage command value vu1* and the second U-phase voltage command value vu2* are shown, but the other first V-phase voltage command value vv1* and first W-phase voltage command value vw1* have the same relationships with the second V-phase voltage command value vv2* and the second W-phase voltage command value vw2*. Therefore, the V-phase voltage command value vv* and the W-phase voltage command value vw* on the stationary coordinates are also updated at the shorter cycles, that is, at the higher frequency, and are input to the voltage application unit 1 as smoother signals compared with the case of the update only at the first operation timing.

In the second embodiment, as shown in FIG. 10, the first-time-point voltage command calculation unit 911, the second-time-point voltage command calculation unit 912, and the third-time-point voltage command calculation unit 913 are selectively operated. Therefore, it is not required to arrange the second voltage command selection unit 914 on a subsequent stage. That is, the second voltage command selection unit 914 may be configured to control the operation of each of the first-time-point voltage command calculation unit 911, the second-time-point voltage command calculation unit 912, and the third-time-point voltage command calculation unit 913. Moreover, when the second voltage command selection unit 914 is arranged on the subsequent stage, the second voltage command selection unit 914 may be configured to simultaneously operate the first-time-point voltage command calculation unit 911, the second-time-point voltage command calculation unit 912, and the third-time-point voltage command calculation unit 913. This is because the second voltage command selection unit 914 is only required to change the object to be selected each time the second operation timing arrives.

Third Embodiment

In a third embodiment of the present invention, the mechanism for generating the second three-phase voltage command values vu2*, vv2*, and vw2* is different from that in the above-mentioned first and second embodiments. Description is now given while focusing on only this mechanism. The same reference symbols are used for the same or substantially the same components as those in the above-mentioned first embodiment.

Figure 12:
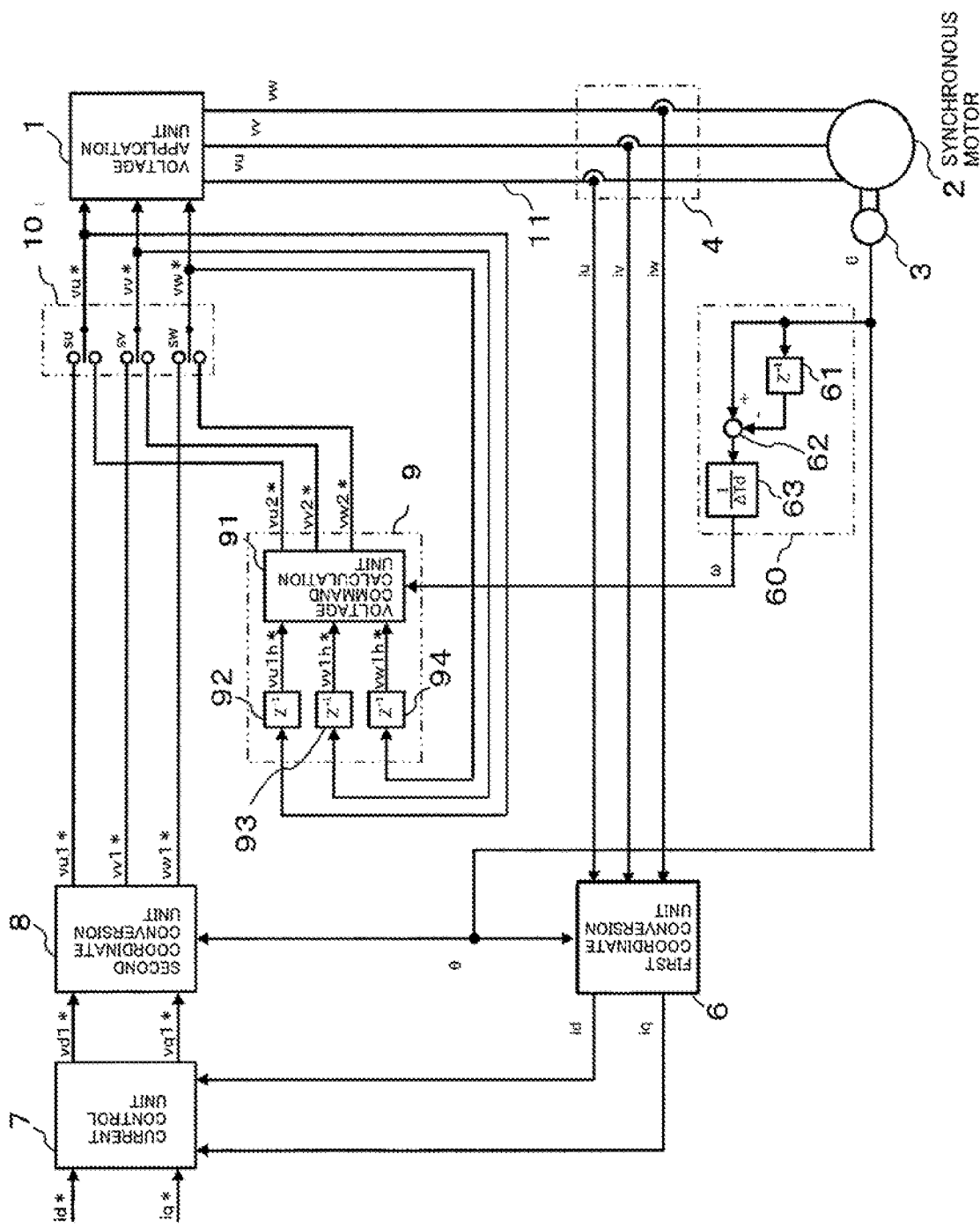
FIG. 12 is a block diagram for illustrating an overall configuration example of a control device for an AC rotating machine according to a third embodiment of the present invention.

FIG. 12 is a block diagram for illustrating an overall configuration example of a control device for an AC rotating machine according to the third embodiment of the present invention. In the third embodiment, as illustrated in FIG. 12, the voltage command generation unit 9 and the voltage command output unit 10 are different from those in the above-mentioned first embodiment. Therefore, the voltage command generation unit 9 and the voltage command output unit 10 are focused in this embodiment.

In the above-mentioned first and second embodiments, the generation of the second three-phase voltage command values vu2*, vv2*, and the vw2' through use of the angular frequency ω output by the angular frequency calculation unit 60 is executed based on the correction of the phases of the first three-phase voltage command values vu1*, vv1*, and vw1*. Meanwhile, in the third embodiment, the three-phase voltage command values vu*, vv*, and vw* output by the voltage command output unit 10 are used as the objects of the correction of the phases. Therefore, each time the three-phase voltage command values vu*, vv*, and vw* output by the voltage command output unit 10 are updated, the voltage command generation unit 9 is configured to hold the three-phase voltage command values vu*, vv*, and vw* after the update. The voltage command generation unit 9 unconditionally holds the three-phase voltage command values vu*, vv*, and vw* after the update, and the voltage command output unit 10 does not thus include the switch flag output unit 10sf.

Meanwhile, the voltage command generation unit 9 includes voltage command value delay-and-hold calculation units 92, 93, and 94 configured to hold the three-phase voltage command values vu*, vv*, and vw* output by the voltage command output unit 10 in place of the storage unit 90. The voltage command value delay-and-hold calculation units 92, 93, and 94 are used to hold the three-phase voltage command values vu*, vv*, and vw* in the respective phases. Specifically, the voltage command value delay-and-hold calculation unit 92 is used to hold the voltage command value vu*. The voltage command value delay-and-hold calculation unit 93 is used to hold the voltage command value vv*. The voltage command value delay-and-hold calculation unit 94 is used to hold the voltage command value vw*.

The voltage command value delay-and-hold calculation units 92, 93, and 94 are memories configured to delay the input data by a delay time interval corresponding to the second operation cycle ΔT2 and then hold the delayed input data, or to hold the input data and then delay the held input data by the delay time interval, to thereby reflect the delayed input data to the output. As a result, the three-phase voltage command values vu1h*, vv1h*, and vw1h* output by the voltage command value delay-and-hold calculation units 92, 93, and 94 are changed at the arrival of the second operation timing. Therefore, the three-phase voltage command values vu1h*, vv1h*, and vw1h* output from the voltage command value delay-and-hold calculation units 92, 93, and 94 to the voltage command calculation unit 91 when the second operation timing arrives are the three-phase voltage command values vu*, vv*, and vw* output from the voltage command output unit 10 when the second operation timing immediately before the second operation timing arrives.

The voltage command calculation unit 91 is configured to use the three-phase voltage command values vu1h*, vv1h*, and vw1h* output from the voltage command value delay-and-hold calculation units 92, 93, and 94 and the angular frequency ω output by the angular frequency calculation unit 60 so as to generate the three-phase voltage command values vu2*, vv2*, and vw2* when only the second operation timing arrives as in the above-mentioned first embodiment. Therefore, the configuration is the same as that in the above-mentioned first embodiment.

FIG. 13 is an example of a time chart for showing operation examples of the respective units in the control device for an AC rotating machine according to the third embodiment of the present invention. This time chart is a time chart in a case in which the second operation cycle ΔT2 is set to ⅕ time the first operation cycle ΔT1. Also in this case, it is assumed that the first operation cycle ΔT1 and the second operation cycle ΔT2 are generated from the reference operation cycle ΔT serving as a reference timing of the operation, and the second operation cycle ΔT2 is set to the reference operation cycle ΔT. On the basis of this assumption, the second operation timing arrives fifth times while the first operation timing arrives each time the first operation cycle ΔT1 elapses. One of the fifth times of the second operation timings arrives at the same timing as the first operation timing.

In FIG. 13, time points (seconds) having the reference operation cycle ΔT as a unit are shown as 0, ΔT, 2ΔT, . . . , 11ΔT on a row (a). On a row (b) to a row (j), operation states at each time point of the position detection unit 3, the current detection unit 4, the first coordinate conversion unit 6, the current control unit 7, the second coordinate conversion unit 8, the angular frequency calculation unit 60, the voltage command value delay-and-hold calculation units 92 to 94, the voltage command calculation unit 91, and the voltage command output unit 10 as the respective units forming the control device for an AC rotating machine are shown, respectively.

Notation "delay and hold" on the row (h) for the voltage command value delay-and-hold calculation units 92 to 94 indicates that the three-phase voltage command values vu*, vv*, and vw* are held, and the three-phase voltage command values vu*, vv*, and vw* delayed by the delay time interval corresponding to the second operation cycle ΔT2 and held are output as the three-phase voltage command values vu1h*, vv1h*, and vw1h*. The voltage command output unit 10 indicated on the row (j) selects and outputs the first three-phase voltage command values vu1*, vv1*, and vw1* when the first operation timing arrives, and selects and outputs the second three-phase voltage command values vu2*, vv2*, and vw2* when only the second operation timing arrives.

Also in the third embodiment, as shown in FIG. 13, the position detection unit 3, the current detection unit 4, the first coordinate conversion unit 6, the current control unit 7, the second coordinate conversion unit 8, and the angular frequency calculation unit 60 are each caused to execute the processing when the first operation timing arrives. The voltage command output unit 10 is caused to select the first three-phase voltage command values vu1*, vv1*, and vw1*. The voltage command calculation unit 91 is caused not to execute the processing.

Meanwhile, as shown in FIG. 13, when only the second operation timing arrives, the processing of using the first three-phase voltage command values vu1h*, vv1h*, and vw1h* output by the voltage command value delay-and-hold calculation units 92 to 94 are executed. None of the position detection unit 3, the current detection unit 4, the first coordinate conversion unit 6, the current control unit 7, the second coordinate conversion unit 8, and the angular frequency calculation unit 60 is caused to execute processing. As a result, also in the third embodiment, the calculation amount required in order to generate the second three-phase voltage command values vu2*, vv2*, and vw2* selected by the voltage command output unit 10 is further suppressed as in the above-mentioned second embodiment. In FIG. 13, a time point 12ΔT and later time points are omitted. For example, the operations from the time point 7ΔT to the time point 11ΔT are repeated after the time point 12ΔT.

When the three-phase voltage command values vu*, vv*, and vw* on the stationary coordinates are updated at the same time intervals as those in the above-mentioned first embodiment, the first operation cycle ΔT1 in the third embodiment can be two and a half times as long as that in the above-mentioned first embodiment. Therefore, in the third embodiment, the calculation amount per unit time can be further suppressed compared with the above-mentioned first embodiment.

Figure 14:
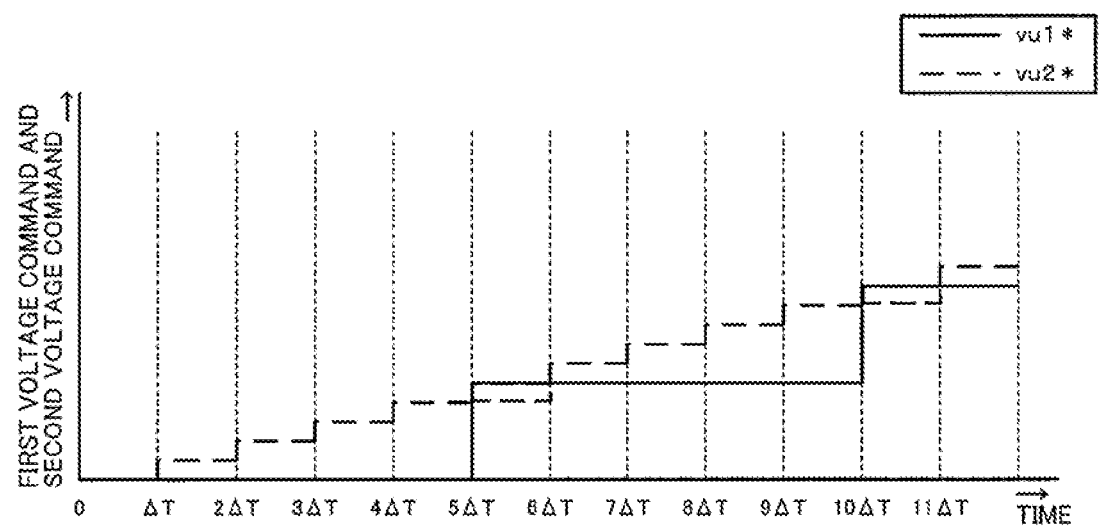
FIG. 14 is a graph for showing an example of a first U-phase voltage command value vu1* on the stationary coordinates and a second U-phase voltage command value vu2* on the stationary coordinates, which are generated when the control device for an AC rotating machine according to the third embodiment of the present invention is operated in accordance with the time chart of FIG. 13.

FIG. 14 is a graph for showing an example of the first U-phase voltage command value vu1* on the stationary coordinates and the second U-phase voltage command value vu2* on the stationary coordinates generated when the control device for an AC rotating machine according to the third embodiment of the present invention is operated in accordance with the time chart of FIG. 13. Also in the example of FIG. 14, a section in which the first U-phase voltage command value vu1* on the stationary coordinates monotonically increases is shown in an extracted form as in the above-mentioned examples of FIG. 7 and FIG. 11.

The first U-phase voltage command value vu1* on the stationary coordinates is updated each time the first operation timing arrives. As a result, as shown in FIG. 14, the first U-phase voltage command value vu1* on the stationary coordinates is updated at the time points 0, 5ΔT, 10ΔT, . . . Meanwhile, the second U-phase voltage command value vu2* on the stationary coordinates is updated each time only the second operation timing arrives. As a result, as shown in FIG. 14, the second U-phase voltage command value vu2* on the stationary coordinates is updated at the time points ΔT, 2ΔT, 3ΔT, 4ΔT, 6ΔT, 7ΔT, 8ΔT, 9ΔT, 11ΔT, . . . . The second U-phase voltage command value vu2* is not updated at the time points 0, 5ΔT, 10ΔT, . . . , and does not thus change until the next update. The second U-phase voltage command value vu2* is generated through use of the voltage command value vu* output immediately before. Therefore, the value of the second U-phase voltage command value vu2* changes in accordance with the time point.

The voltage command output unit 10 selects the first U-phase voltage command value vu1* at the time points 0, 5ΔT, 10ΔT, . . . , and selects the second U-phase voltage command value vu2* at the time points ΔT, 2ΔT, 3ΔT, 4ΔT, 6ΔT, 7ΔT, 8ΔT, 9ΔT, 11ΔT, . . . Consequently, the U-phase voltage command value vu* on the stationary coordinates output from the voltage command output unit 10 is the voltage command value updated each time the second operation timing arrives, that is, at the time points 0, ΔT, 2ΔT, 3ΔT, 4ΔT, 5ΔT, 6ΔT, 7ΔT, 8ΔT, 9ΔT, 10ΔT, 11ΔT, . . . . As a result, the U-phase voltage command value vu* on the stationary coordinates is updated at the shorter cycles, that is, at the higher frequency, and is input to the voltage application unit 1 as a smoother signal compared with a case of the update only at the first operation timing.

In FIG. 14, only the first U-phase voltage command value vu1* and the second U-phase voltage command value vu2* are shown, but the other first V-phase voltage command value vv1* and first W-phase voltage command value vw1* have the same relationships with the second V-phase voltage command value vv2* and the second W-phase voltage command value vw2*. Therefore, the V-phase voltage command value vv* and the W-phase voltage command value vw* on the stationary coordinates are also updated at the shorter cycles, that is, at the higher frequency, and are input to the voltage application unit 1 as smoother signals compared with the case of the update at the first operation timing.

In the above-mentioned first to third embodiments, the first coordinate conversion unit 6, the current control unit 7, the second coordinate conversion unit 8, the voltage command generation unit 9, the voltage command output unit 10, and the angular frequency calculation unit 60 are each implemented by the digital circuit, which is, for example, a microcomputer. When each of those units 6 to 10 and 60 is implemented by a subprogram, each of the units 6 to 10 and 60 can be caused to appropriately operate by sharing data required among the subprograms.

In this case, the subprograms can be divided into a first group, which is the object to be operated at the first operation timing, and the second group, which is the object to be operated at the second operation timing. When the subprograms are divided into the two groups as describe above, the execution intervals of the subprograms are only required to be the second operation cycles ΔT2. As described above, the position detection unit 3 is configured to output the rotation position θ each time the first operation cycle ΔT1 elapses. Therefore, the group to be executed may be selected in accordance with the absence or presence of the output of the rotation position θ at the execution timing of the subprograms. The selection of the group to be executed corresponds to the function of the voltage command output unit 10. Therefore, the voltage command output unit 10 may be arranged at a location different from the subsequent stage of the second coordinate conversion unit 8 and the voltage command generation unit 9.

Fourth Embodiment

The above-mentioned first to third embodiments relate to the control devices for an AC rotating machine. Those control devices for an AC rotating machine are applicable to a device configured to use the AC rotating machine as power. A fourth embodiment of the present invention is an example in which the control device for an AC rotating machine is applied as a control device for an electric power steering system in a vehicle, for example, an automobile, which is configured to use the AC rotating machine as a power source of the electric power steering system. Therefore, the fourth embodiment corresponds to the control device for an electric power steering system according to the first embodiment of the present invention. Also in this embodiment, the same reference symbols are assigned to the same or substantially the same components as those in the above-mentioned first embodiment, and description is given while focusing on only differences from the above-mentioned first embodiment.

Figure 15:
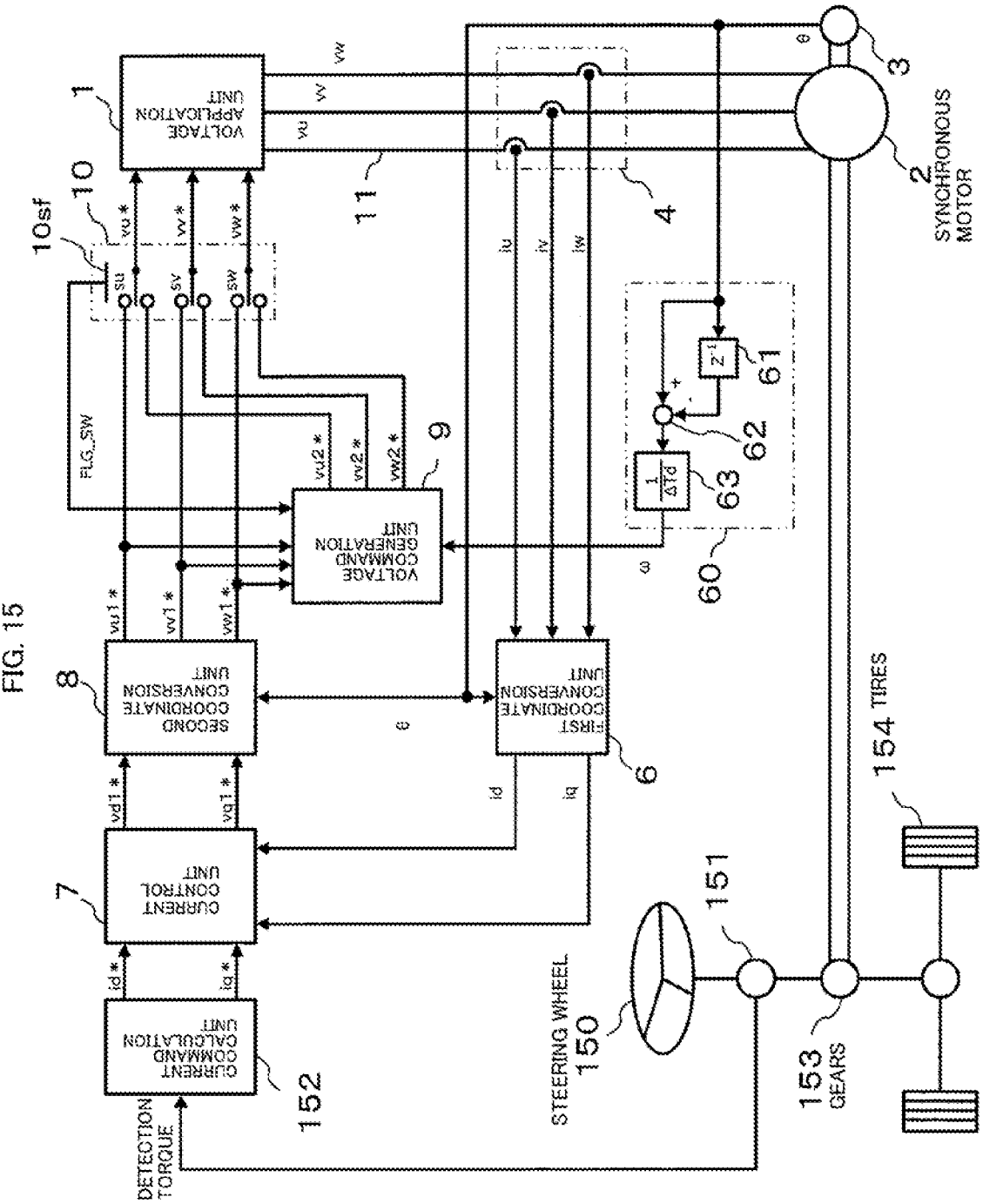
FIG. 15 is a block diagram for illustrating an overall configuration example of a control device for an electric power steering system according to a fourth embodiment of the present invention.

FIG. 15 is a block diagram for illustrating an overall configuration example of the control device for an electric power steering system according to the fourth embodiment of the present invention. The control device for an electric power steering system according to this fourth embodiment corresponds to the above-mentioned first embodiment applied as the control device for an electric power steering system. Therefore, the fourth embodiment includes all of the components illustrated in FIG. 1. In FIG. 15, components having the same reference symbols as those in the above-mentioned first embodiment are the same or corresponding components. As illustrated in FIG. 15, in the fourth embodiment, a steering wheel 150, a torque detection unit 151, a current command calculation unit 152, and gears 153 are added compared with the above-mentioned first embodiment.

When a driver operates the steering wheel 150 to generate a steering torque in a steering mechanism of the vehicle, this steering torque is detected by the torque detection unit 151. When the torque detection unit 151 detects this steering torque, the torque detection unit 151 outputs a detection result as a detection torque. This detection torque is output in a form of a digital signal from the torque detection unit 151 to the current command calculation unit 152.

The AC rotating machine 2 is the power source configured to generate an assist torque for assisting the steering torque. The assist torque generated by this AC rotating machine 2 is transmitted to a steering mechanism for tires 154 of the vehicle through the gears 153. Therefore, in order to cause the AC rotating machine 2 to generate the assist torque for assisting the steering torque, the current command calculation unit 152 uses the detection torque output from the torque detection unit 151 so as to calculate the two-phase current command values id* and iq* on the rotational coordinates, and outputs the calculated two-phase current command values id* and iq* to the current control unit 7.

In the above-mentioned first embodiment, the first coordinate conversion unit 6, the current control unit 7, the second coordinate conversion unit 8, the voltage command generation unit 9, the voltage command output unit 10, and the angular frequency calculation unit 60 are each implemented by the digital circuit, which is, for example, a microcomputer. The current command calculation unit 152 is also implemented by the digital circuit.

The current command calculation unit 152 is configured to use the detection torque input from the torque detection unit 151 so as to generate the two-phase current command values id* and iq* on the rotational coordinates, to output the generated two-phase current command values id* and iq* on the rotational coordinates to the current control unit 7. As a result, the current control unit 7 uses the two-phase current command values id* and iq* on the rotational coordinates input from the current command calculation unit 152 and the two-phase detection currents id and iq input from the first coordinate conversion unit 6 so as to generate the two-phase voltage command values vd1* and vq1* on the rotational coordinates, and outputs the generated two-phase voltage command values vd1* and vq1* to the second coordinate conversion unit 8. The two-phase voltage command values vd1* and vq1* on the rotational coordinates generated by the current control unit 7 are digital signals.

The second coordinate conversion unit 8 is configured to input the two-phase voltage command values vd1* and vq1* on the rotational coordinates output by the current control unit 7, to thereby generate and output the first three-phase voltage command values vu1*, vv1*, and vw1* on the stationary coordinates. Consequently, the voltage command generation unit 9 uses the first three-phase voltage command values vu1*, vv1*, and vw1* output by the second coordinate conversion unit 8 and the angular frequency ω output by the angular frequency calculation unit 60 so as to generate the second three-phase voltage command values vu2*, vv2*, and vw2* on the stationary coordinates. As a result, the voltage application unit 1 uses the first three-phase voltage command values vu1*, vv1*, and vw1* or the second three-phase voltage command values vu2*, vv2*, and vw2* output by the voltage command output unit 10 as the three-phase voltage command values vu*, vv*, and vw* on the stationary coordinates so as to generate the three-phase AC voltages vu, vv, and vw, and applies the three-phase AC voltages vu, vv, and vw to the AC rotating machine 2.

The cycle at which the first three-phase voltage command values vu1*, vv1*, and vw1* is updated by the second coordinate conversion unit 8 by using the two-phase voltage command values vd1* and vq1* output by the current control unit is the first operation cycle ΔT1. Therefore, when the calculation cycle of the current command calculation unit 152 is shorter than the first operation cycle ΔT1, the current command calculation unit 152 may execute useless calculation. This is because the two-phase voltage command values vd1* and vq1* calculated by the current command calculation unit 152 are not always used. Thus, it is preferred that the calculation cycle of the current command calculation unit 152 be equal to or longer than the first operation cycle ΔT1 in order to avoid the unnecessary calculation load.

The noise emitted by the AC rotating machine 2 can greatly be reduced through the application of the above-mentioned first embodiment to the control device for an electric power steering system. Therefore, the sense of discomfort given to the driver by the noise emitted by the AC rotating machine 2 can be avoided, or can greatly be reduced. Moreover, the calculation amount per unit time can also greatly be reduced. When the calculation cycle of the current command calculation unit 152 is equal to or longer than the first operation cycle ΔT1, it is possible to further suppress the calculation amount per unit time while reducing the sense of discomfort given to the driver by the noise emitted by the AC rotating machine 2.

In the fourth embodiment, the above-mentioned first embodiment is applied so as to form the control device for an electric power steering system, but the above-mentioned second embodiment or the above-mentioned third embodiment may be applied so as to form the control device for an electric power steering system.

REFERENCE SIGNS LIST 1 voltage application unit, 2 AC rotating machine, 3 position detection unit, 4 current detection unit, 6 first coordinate conversion unit, 7 current control unit, 8 second coordinate conversion unit, 9 voltage command generation unit, 10 voltage command output unit, 151 torque detection unit, 152 current command calculation unit

The invention claimed is:

1. A control device for an AC rotating machine, comprising:
   a voltage application unit configured to apply voltages to the AC rotating machine based on voltage command values on stationary coordinates;
   a current detection unit configured to detect currents in a plurality of phases flowing through the AC rotating machine;
   a first coordinate conversion unit configured to set the currents detected in the plurality of phases by the current detection unit as detection currents on the stationary coordinates, and apply coordinate conversion to the detection currents on the stationary coordinates based on any phase of the AC rotating machine, to thereby output detection currents on rotational coordinates;
   a current control unit configured to output voltage command values on the rotational coordinates based on current command values on the rotational coordinates, which specify currents to be supplied to the AC rotating machine, and on the detection currents on the rotational coordinates;
   a second coordinate conversion unit configured to apply coordinate conversion to the voltage command values on the rotational coordinates based on the any phase, to thereby output first voltage command values on the stationary coordinates;
   a voltage command generation unit configured to set one of the first voltage command values on the stationary coordinates and second voltage command values on the stationary coordinates generated immediately before as target command values, and correct phases of the target command values based on a change rate of the any phase, to thereby generate the second voltage command values on the stationary coordinates without using the detection current; and
   a voltage command output unit configured to select one of the second voltage command values on the stationary coordinates generated by the voltage command generation unit and the first voltage command values on the stationary coordinates generated by the second coordinate conversion unit, to thereby output the selected one of the second voltage command values and the first voltage command values as the voltage command values on the stationary coordinates.

2. The control device for an AC rotating machine according to claim 1, wherein a calculation cycle of the coordinate conversion to be executed by at least one of the first coordinate conversion unit or the second coordinate conversion unit is longer than an update cycle at which the voltage command values on the stationary coordinates output by the voltage command output unit are updated.

3. The control device for an AC rotating machine according to claim 1, wherein a detection cycle of the detection of the currents in the plurality of phases by the current detection unit is longer than an update cycle at which the voltage command values on the stationary coordinates output by the voltage command output unit are updated.

4. The control device for an AC rotating machine according to claim 1, wherein the voltage command generation unit includes:
   a storage unit configured to store, as the target command values, the first voltage command values on the stationary coordinates to be selected by the voltage command output unit as the voltage command values on the stationary coordinates; and
   a voltage command calculation unit configured to correct the phases of the target command values stored in the storage unit based on the change rate, to thereby generate the second voltage command values on the stationary coordinates.

5. The control device for an AC rotating machine according to claim 1, wherein the voltage command generation unit includes:
   a storage unit configured to store, as the target command values, the first voltage command values on the stationary coordinates to be selected by the voltage command output unit as the voltage command values on the stationary coordinates;
   a plurality of voltage command calculation units configured to correct the phases of the target command values stored in the storage unit based on the change rate, to thereby generate third voltage command values on the stationary coordinates at assumed time points different from one another; and
   a voltage command selection unit configured to select one of the third voltage command values on the stationary coordinates generated by the respective plurality of voltage command calculation units, to thereby output the selected one of the third voltage command values as the second voltage command values on the stationary coordinates.

6. The control device for an AC rotating machine according to one of claim 1, wherein the voltage command generation unit includes:
   a storage unit configured to store, as the target command values, the voltage command values on the stationary coordinates to be output by the voltage command output unit; and
   a voltage command calculation unit configured to correct the phases of the target command values stored in the storage unit based on the change rate, to thereby generate the second voltage command values on the stationary coordinates.

7. A control device for an electric power steering, the electric power steering system being configured to use an AC rotating machine as a power source for generating an assist torque for assisting a steering torque of a vehicle, the control device for the electric power steering system comprising:
   the control device for the AC rotating machine of claim 1;
   a torque detection unit configured to detect the steering torque to output the steering torque as a detection torque; and
   a current command calculation unit configured to generate, based on the detection torque, the current command values on the rotational coordinates to be output to the control device for the AC rotating machine.

* * * * *